US008870118B2

(12) United States Patent
Moselage, III

(10) Patent No.: US 8,870,118 B2
(45) Date of Patent: Oct. 28, 2014

(54) METHOD AND SYSTEMS FOR USE IN ASSEMBLING A FUSELAGE

(75) Inventor: John H. Moselage, III, Renton, WA (US)

(73) Assignee: The Boeing Company, Chicago, IL (US)

( * ) Notice: Subject to any disclaimer, the term of this patent is extended or adjusted under 35 U.S.C. 154(b) by 81 days.

(21) Appl. No.: 13/465,395

(22) Filed: May 7, 2012

(65) Prior Publication Data
US 2013/0292514 A1 Nov. 7, 2013

(51) Int. Cl.
*B64C 1/00* (2006.01)

(52) U.S. Cl.
USPC .......................................... 244/120; 244/131

(58) Field of Classification Search
USPC ................... 244/131, 132, 119, 120
See application file for complete search history.

(56) References Cited

U.S. PATENT DOCUMENTS

| 3,253,842 A | * | 5/1966 | Rabe ............................... 285/81 |
| 4,435,104 A | * | 3/1984 | Held ............................. 403/332 |
| 5,014,934 A | * | 5/1991 | McClaflin ..................... 244/132 |
| 5,145,276 A | * | 9/1992 | Demange ....................... 403/349 |
| 6,273,634 B1 | * | 8/2001 | Lohbeck ........................ 403/297 |
| 6,328,261 B1 | * | 12/2001 | Wollaston et al. ............. 244/132 |
| 6,520,708 B1 | * | 2/2003 | Jung et al. ..................... 403/282 |
| 7,025,385 B2 | * | 4/2006 | Drescher .......................... 285/91 |
| 7,168,486 B2 | * | 1/2007 | Hackworth et al. ........ 166/242.6 |
| 7,416,363 B2 | * | 8/2008 | Kozhuev ........................ 403/364 |
| 7,478,781 B2 | * | 1/2009 | Granzeier et al. ............ 244/131 |
| 7,530,607 B2 | * | 5/2009 | Luft .............................. 285/402 |

OTHER PUBLICATIONS

U.S. Appl. No. 13/303,269, filed Nov. 23, 2011.

* cited by examiner

*Primary Examiner* — Tien Dinh
*Assistant Examiner* — Keith L Dixon
(74) *Attorney, Agent, or Firm* — Armstrong Teasdale LLP

(57) ABSTRACT

A fuselage assembly is provided. The fuselage assembly includes a first barrel section including a body that extends from a first end to a second end and a second barrel section coupled to said first barrel section. The second barrel section includes a body that extends from a first end to a second end, and the second end of the first barrel section is coupled to the second end of the second barrel section. At least one member maintains a coupling between the first barrel section and the second barrel section. The at least one member induces a compressive force to at least one of the first barrel section and the second barrel section.

19 Claims, 19 Drawing Sheets

METHOD AND SYSTEMS FOR USE IN ASSEMBLING A FUSELAGE

BACKGROUND

The field of the present disclosure relates generally to aircraft construction, and more particularly to methods and systems for use in assembling an aircraft fuselage.

At least some known fuselage assemblies are manufactured using panelized construction using a plurality of barrel sections that include a combination of longerons, stringers, bulkheads, and frames. The longerons, stringers, bulkheads, and frames reinforce the skin of the aircraft and maintain a rigid cross-sectional shape of the fuselage. Moreover, manufacturing aircraft components requires thousands of fasteners. The fasteners are used to couple the substructure components to the skin of the aircraft and couple adjacent barrel sections together. For example, in known assemblies where barrel sections are joined end to end, it is known to bond the ends of the barrel sections together and to use fasteners to prevent the barrel sections from separating from each other.

Recently, at least some known aircraft components have increasingly been fabricated from composite materials in combination with other materials such as aluminum, titanium, and steel. The composite materials generally reduce the weight of the aircraft leading to increases in the fuel efficiency of the aircraft. However, in at least some known fuselages assembled from composite materials, single piece barrel sections are fabricated and coupled together end to end in a manner that is similar to that of a traditional fuselage barrel assembly.

Coupling traditional and composite barrel sections together requires accurately drilling holes for the fasteners. Accurately drilling fastener holes may be a time consuming and laborious task that in some cases may account for up to at least half of the total manufacturing time for fuselage barrel section assembly. Moreover, the drill holes may require deburring prior to fasteners being used. Elimination of the fasteners facilitates reducing overall weight of the finished assembly. Furthermore, using thousands of fasteners increases joint weight and may increase the amount of stress induced to the joint.

BRIEF DESCRIPTION

In one embodiment, a method of assembling a fuselage is provided. The method includes providing a first barrel section that includes a body that extends from a first end to a second end, and providing a second barrel section is that includes a body that extends from a first end to a second end. The method further includes coupling the first barrel section second end to the second barrel section second end and inducing a compressive force to at least one of the first barrel section and the second barrel section to maintain the coupling therebetween.

In another embodiment, a fuselage assembly is provided. The fuselage assembly includes a first barrel section including a body that extends from a first end to a second end and a second barrel section coupled to said first barrel section. The second barrel section includes a body that extends from a first end to a second end, and the second end of the first barrel section is coupled to the second end of the second barrel section. At least one member maintains a coupling between the first barrel section and the second barrel section. The at least one member induces a compressive force to at least one of the first barrel section and the second barrel section.

In yet another embodiment, an aircraft is provided. The aircraft includes a first fuselage component including a body that extends from a first end to a second end. A second fuselage component is coupled to the first fuselage component, and the second fuselage component includes a body that extends from a first end to a second end. The first fuselage component body and the second fuselage component body include an arcuate configuration. At least one member is included that is operable to maintain a coupling between the first fuselage component and the second fuselage component. The at least one member is configured to induce a compressive force to at least one of the first fuselage component and the second fuselage component.

DETAILED DESCRIPTION

Embodiments described herein are directed to using the principle of physical capture to assemble adjacent aircraft components. More specifically, as described herein, the principle of physical capture is used to couple adjacent barrel sections of an aircraft fuselage together in a manner that facilitates either substantially reducing or essentially eliminating the need for fasteners. As a result, a need to accurately locate and drill multiple fastener holes circumferentially about the fuselage is essentially eliminated. As such, assembly times are substantially reduced.

Figure 1:
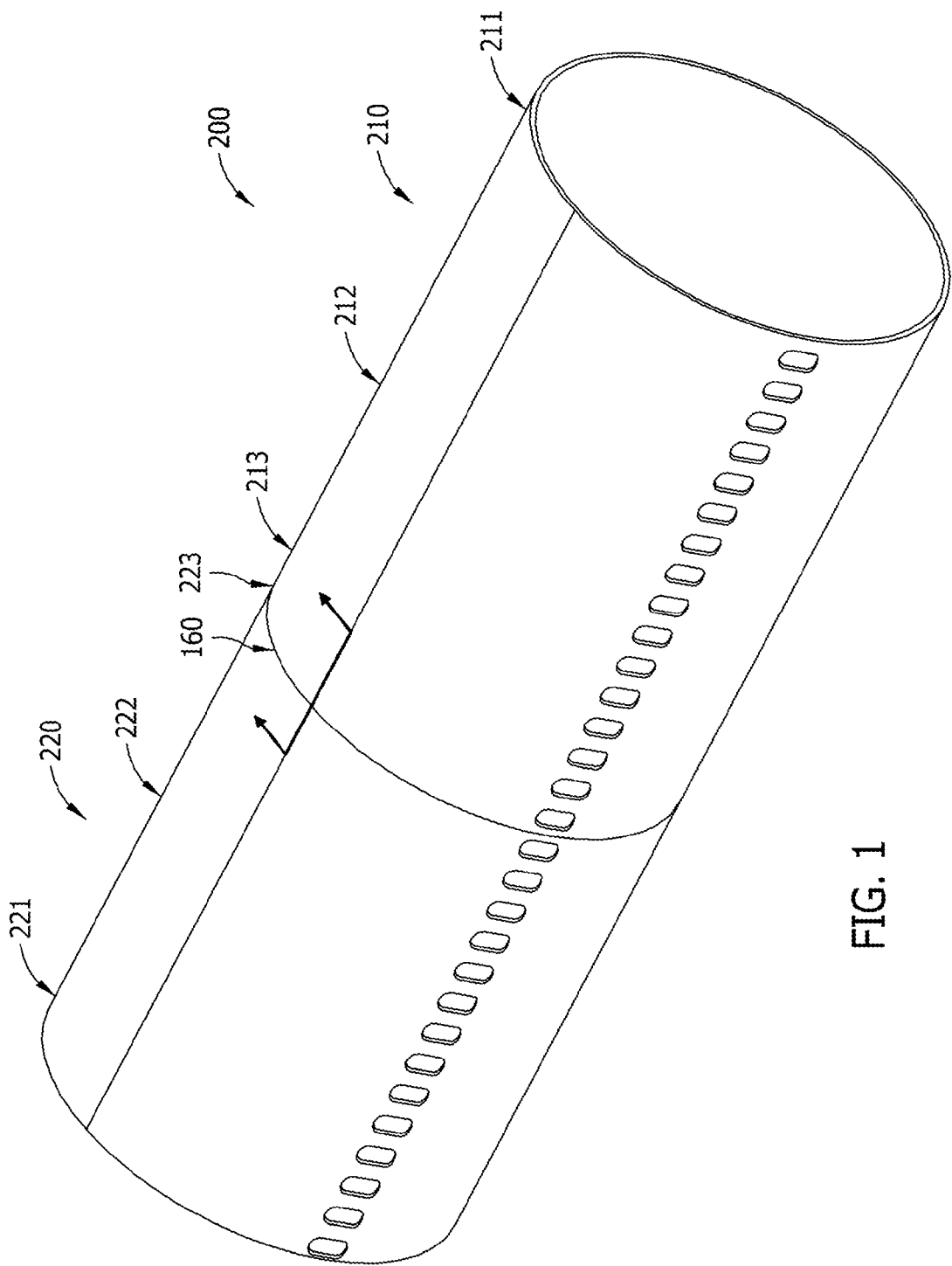
FIG. 1 is a perspective view of an exemplary fuselage assembly.

FIG. 1 is a perspective view of an exemplary fuselage assembly 200. In the exemplary embodiment, fuselage assembly 200 includes a first barrel section 210 and a second barrel section 220. First barrel section 210 includes a body 212 that extends from a first end 211 to a second end 213 and second barrel section 220 includes a body 222 that extends from a first end 221 to a second end 223. In the exemplary embodiment, the respective second ends 213 and 223 of first and second barrel sections 210 and 220 are coupled together at a joint 160. Moreover, in an alternative embodiment, second ends 213 and 223 include physical capture features (not shown in FIG. 1).

Figure 2:
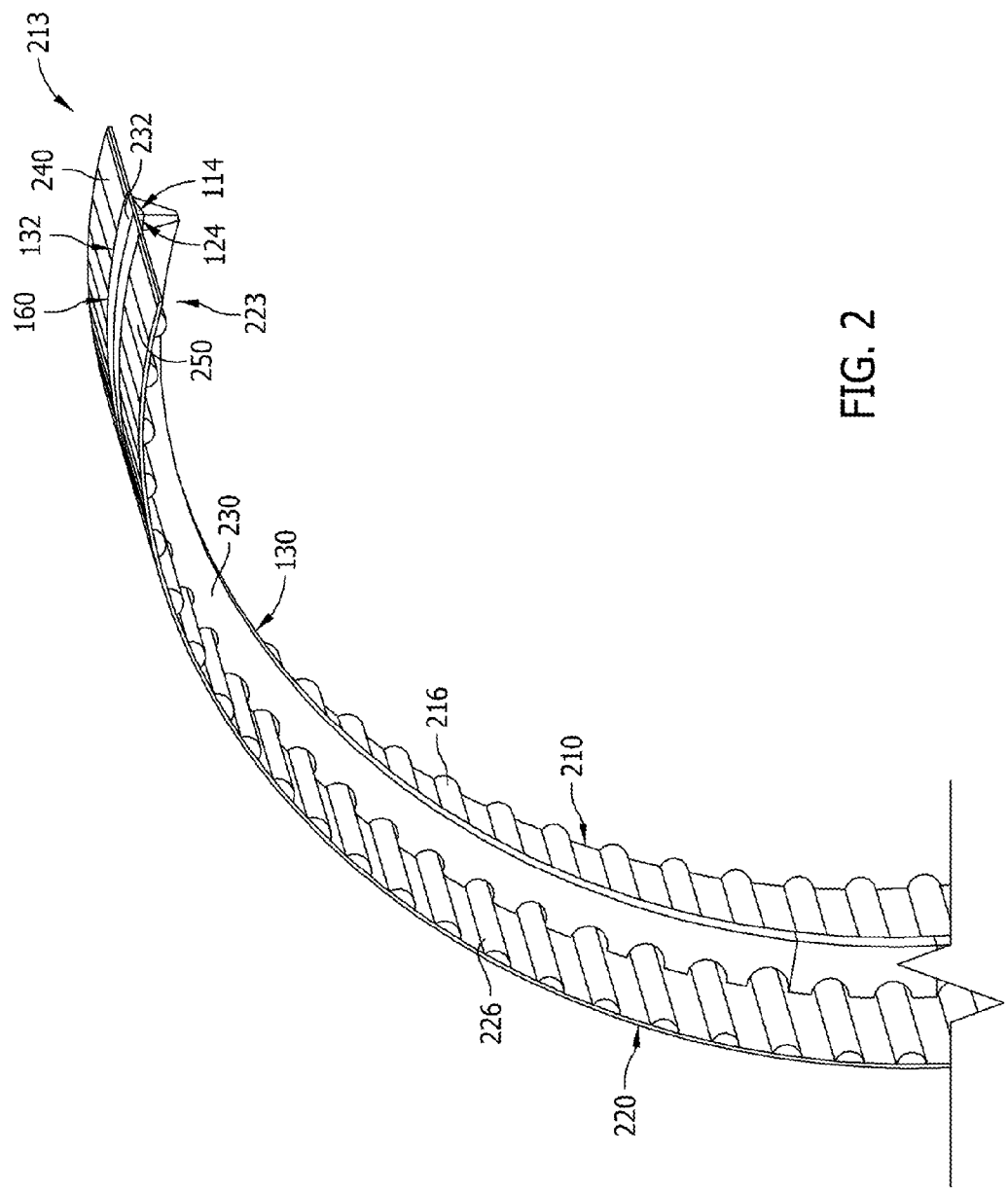
FIG. 2 is a perspective cutaway view of the fuselage assembly shown in FIG. 1.

FIG. 2 is a perspective cutaway view of fuselage assembly 200 (shown in FIG. 1). In the exemplary embodiment, joint 160 is defined at a location between first barrel section 210 and second barrel section 220. Moreover, in the exemplary embodiment, barrel section 210 includes a plurality of first stringers 216, and barrel section 220 includes a plurality of second stringers 226. Physical capture features 114 and 124 are formed at second ends 213 and 223 of respective barrel sections 210 and 220. A compression member 130 and a tension member 132 facilitate preventing first barrel section 210 from uncoupling from second barrel section 220. In the exemplary embodiment, compression member 130 is an inner mold line (IML) frame 230 and tension member 132 is an outer mold line (OML) wrap 232.

Figure 3:
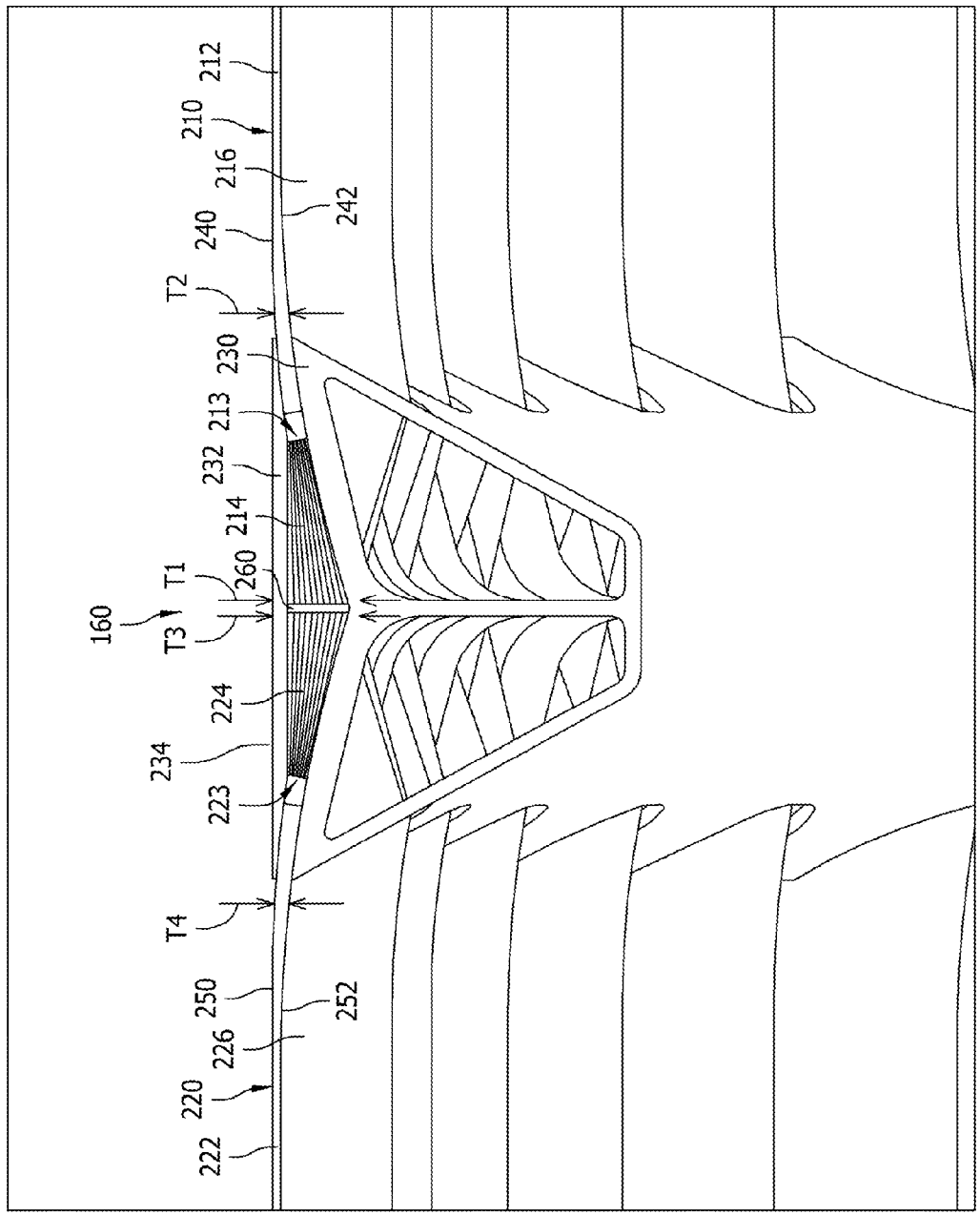
FIG. 3 is a cross-sectional view of an exemplary wedge joint embodiment that may be used in assembling a fuselage.

FIG. 3 is a cross-sectional view of an exemplary wedge joint 160 that may be used in assembling fuselage assembly 200 (shown in FIG. 1). First barrel section 210 includes body 212 that extends from first end 211 (shown in FIG. 1) to second end 213. Second end 213 has a thickness $T_1$ that is greater than a thickness $T_2$ of body 212. For example, second end 213 may include a wedge 214, i.e. a tapered thickness $T_1$ that facilitates physical capture. Second barrel section 220 includes body 222 that extends from first end 221 (shown in FIG. 1) to second end 223. Second end 223 has a thickness $T_3$ that is greater than a thickness $T_4$ of body 222. For example, second end 223 may include a wedge 224, i.e. a tapered thickness $T_3$ that facilitates physical capture. In the exemplary embodiment, barrel sections 210 and 220 are coupled at a bond joint 260 such that IML frame 230 engages wedges 214 and 224 and induces a compressive force to barrel sections 210 and 220, respectively. For example, in the exemplary embodiment, IML frame 230 substantially encapsulates wedges 214 and 224. As such, in the event of bond failure along bond joint 260, IML frame 230 facilitates preventing barrel section 210 from uncoupling from barrel section 220 by preventing wedges 214 and 224 from uncoupling from each other. Moreover, in the exemplary embodiment, OML wrap 232 induces a compressive force to barrel sections 210 and 220 to facilitate stabilizing IML frame 230 and to facilitate applying clamp-up pressure to wedges 214 and 224.

In the exemplary embodiment, IML frame 230 is positioned to span joint 160 and is secured circumferentially against an inner surface 242 of barrel section 210 and against an inner surface 252 of barrel section 220. As such, IML frame 230 induces a compressive force to barrel sections 210 and 220 to facilitate preventing first barrel section 210 from uncoupling from second barrel section 220. Moreover, in the exemplary embodiment, IML frame 230 extends substantially circumferentially about an inner circumference of barrel sections 210 and 220 at joint 160. For example, IML frame 230 may be coupled circumferentially against first and second barrel sections 210 and 220 in arcuate portions.

Furthermore, in the exemplary embodiment, fuselage assembly 200 includes OML wrap 232. OML wrap 232 extends circumferentially about an outer surface 240 of barrel section 210 and an outer surface 250 of barrel section 220. In exemplary embodiments, OML wrap 232 spans joint 160 and is secured circumferentially against outer surfaces 240 and 250. As such, OML wrap 232 induces a compressive force to barrel sections 210 and 220 to effectively clamp joint 160 and facilitate preventing first barrel section 210 from uncoupling from second barrel section 220. Furthermore, the compressive force induced by OML wrap 232 facilitates stabilizing IML frame 230 by constricting barrel sections 210 and 220 along joint 160. More specifically, the compressive force is induced to IML frame 230 along joint 160 such that IML frame 230 is maintained in position relative to barrel sections 210 and 220. In alternative embodiments, OML wrap 232 is positioned within a recessed area (not shown) such that an outer surface 234 of OML wrap 232 is substantially flush with respect to outer surfaces 240 and 250 of barrel sections 210 and 220. In exemplary embodiments, tension member 132 has a width that is approximately the same as a width of compression member 130. For example, the width of tension member 132 may be selected such that OML wrap 232 applies a compressive force evenly along the width of IML frame 230.

During operation, barrel sections 210 and 220 may distort, causing barrel sections 210 and 220 to shift such that IML frame 230 is displaced from inner surfaces 242 and/or 252 of barrel sections 210 and 220, respectively. As such, in one embodiment, fuselage assembly 200 may include a plurality of barrel nuts (not shown) to secure at least one of IML frame 230 and OML wrap 232 against a respective barrel section 210 and/or 220. For example, in such an embodiment, a barrel nut bore (not shown) may extend through OML wrap 232, first barrel section 210, and IML frame 230 to enable a barrel nut to be inserted therethrough. Likewise, in such an embodiment, a barrel nut may be inserted through a barrel nut bore drilled through OML wrap 232, second barrel section 220, and IML frame 230. Furthermore, in an alternative embodiment, a flush-mount fastener may be inserted from the outer mold line through the barrel nut bore. The flush-mount fastener may engage with the barrel nut such that additional clamp-up pressure is applied to wedges 214 and 224 regardless of the presence of barrel deflection.

Figure 4:
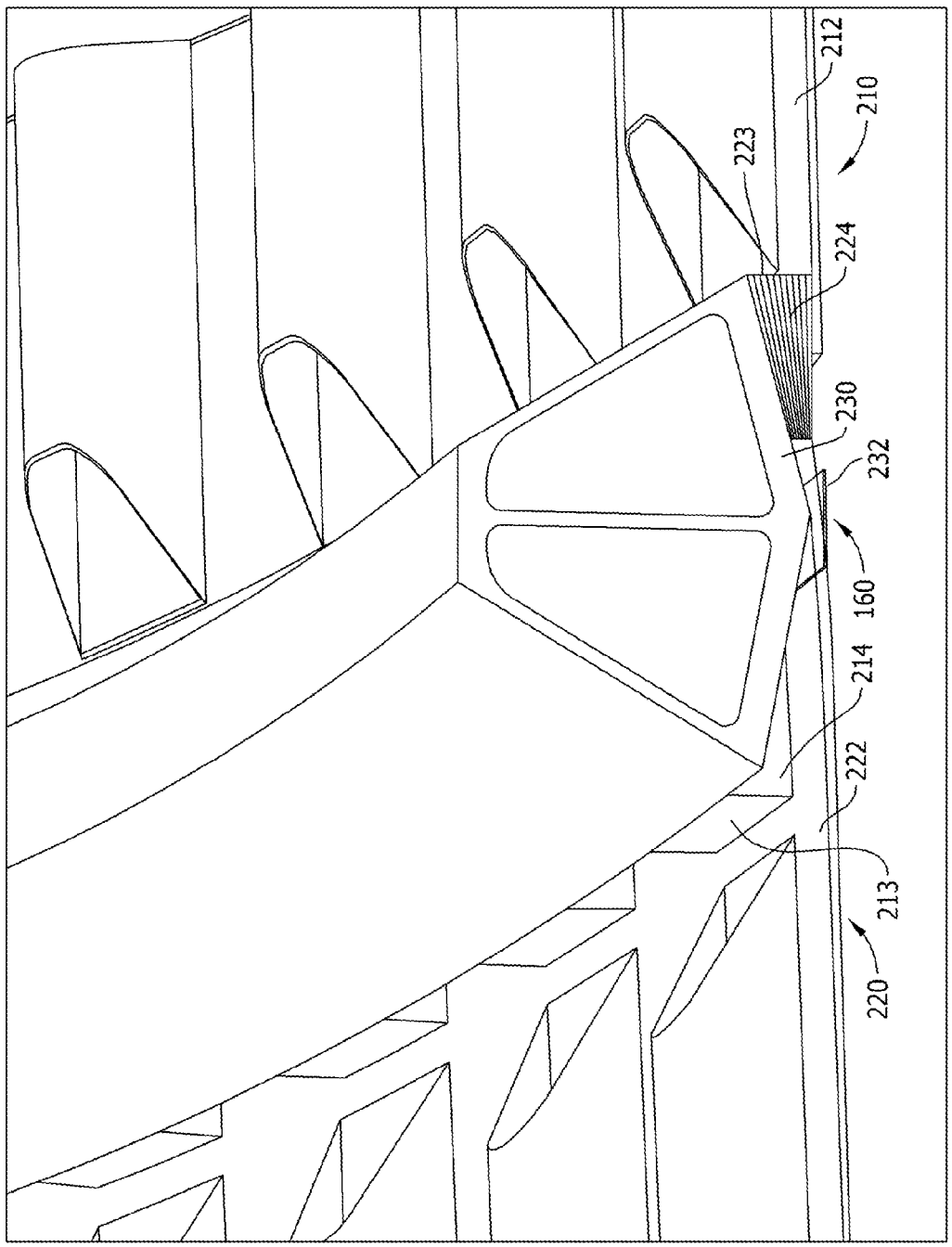
FIG. 4 is a sectional view of a wedge pass-through joint that may be used in assembling a fuselage.

FIG. 4 is a sectional view of an exemplary wedge pass-through joint 160 that may be used in assembling fuselage assembly 200 (shown in FIG. 1). In the exemplary embodiment, second ends 213 and 223 each include respective wedges 214 and 224 that extend from respective bodies 212 and 222, such that wedges 214 and 224 interlock. For example, when barrel sections 210 and 220 are coupled together, wedge 214 circumvents joint 160 and engages body 222. Similarly, wedge 224 circumvents joint 160 and engages body 212. IML frame 230 induces a compressive force to barrel sections 210 and 220 and facilitates preventing first barrel section 210 from uncoupling from second barrel section 220. For example, in the exemplary embodiment, IML frame 230 substantially conforms against wedges 214 and 224 and has a tapered cross-sectional shape. In the event of bond failure, wedges 214 and 224 are prevented from disengaging from IML frame 230. OML wrap 232 induces a compressive force to barrel sections 210 and 220 to facilitate stabilizing IML frame 230 and to facilitate applying clamp-up pressure to wedges 214 and 224.

Figure 5:
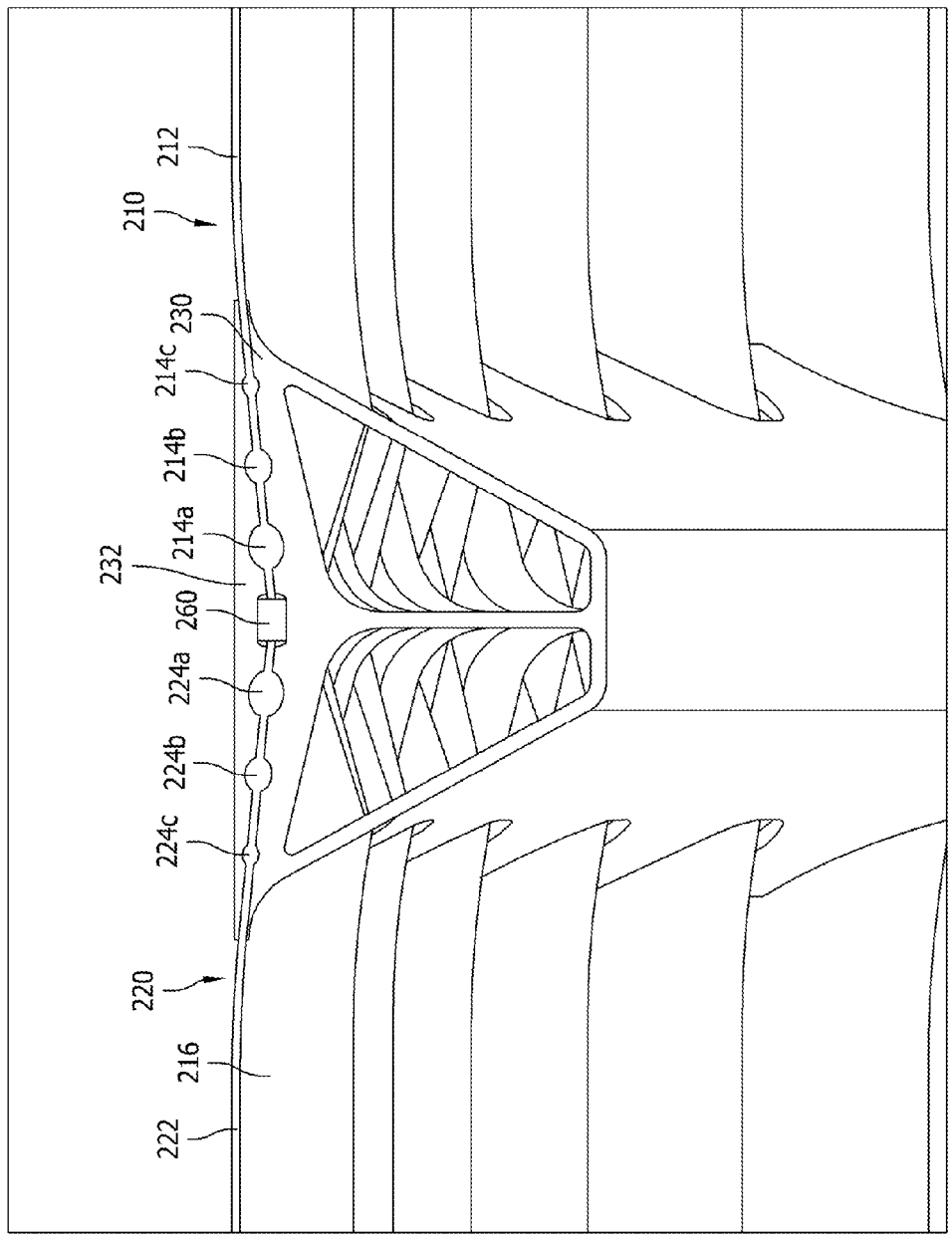
FIG. 5 is a cross-sectional view of an exemplary multi-physical capture feature joint that may be used in assembling a fuselage.

FIG. 5 is a cross-sectional view of an exemplary multi-physical capture joint 160 that may be used in assembling fuselage assembly 200 (shown in FIG. 1). In the exemplary embodiment, first barrel section 210 includes a plurality of physical capture features, such as nodules 214a, 214b, and 214c. Similarly, second barrel section 220 includes a plurality of physical capture features, such as nodules 224a, 224b, and 224c. Each nodule 214a, 214b, 214c, 224a, 224b, and 224c is thicker than an associated body 212 and 222. IML frame 230 substantially mates with nodules 214a, 214b, and 214c and 224a, 224b, and 224c to facilitate preventing first barrel section 210 from uncoupling from second barrel section 220. In the event of bond failure at bond joint 260, nodules 214a, 214b, and 214c and 224a, 224b, and 224c are prevented from disengaging with IML frame 230. Similarly, OML wrap 232 substantially mates with nodules 214a, 214b, and 214c and 224a, 224b, and 224c induces a compressive force to barrel sections 210 and 220 to facilitate stabilizing IML frame 230 and to also prevent disengagement of nodules 214a, 214b, and 214c and 224a, 224b by providing additional clamp-up pressure in the event of bond failure.

Figure 6:
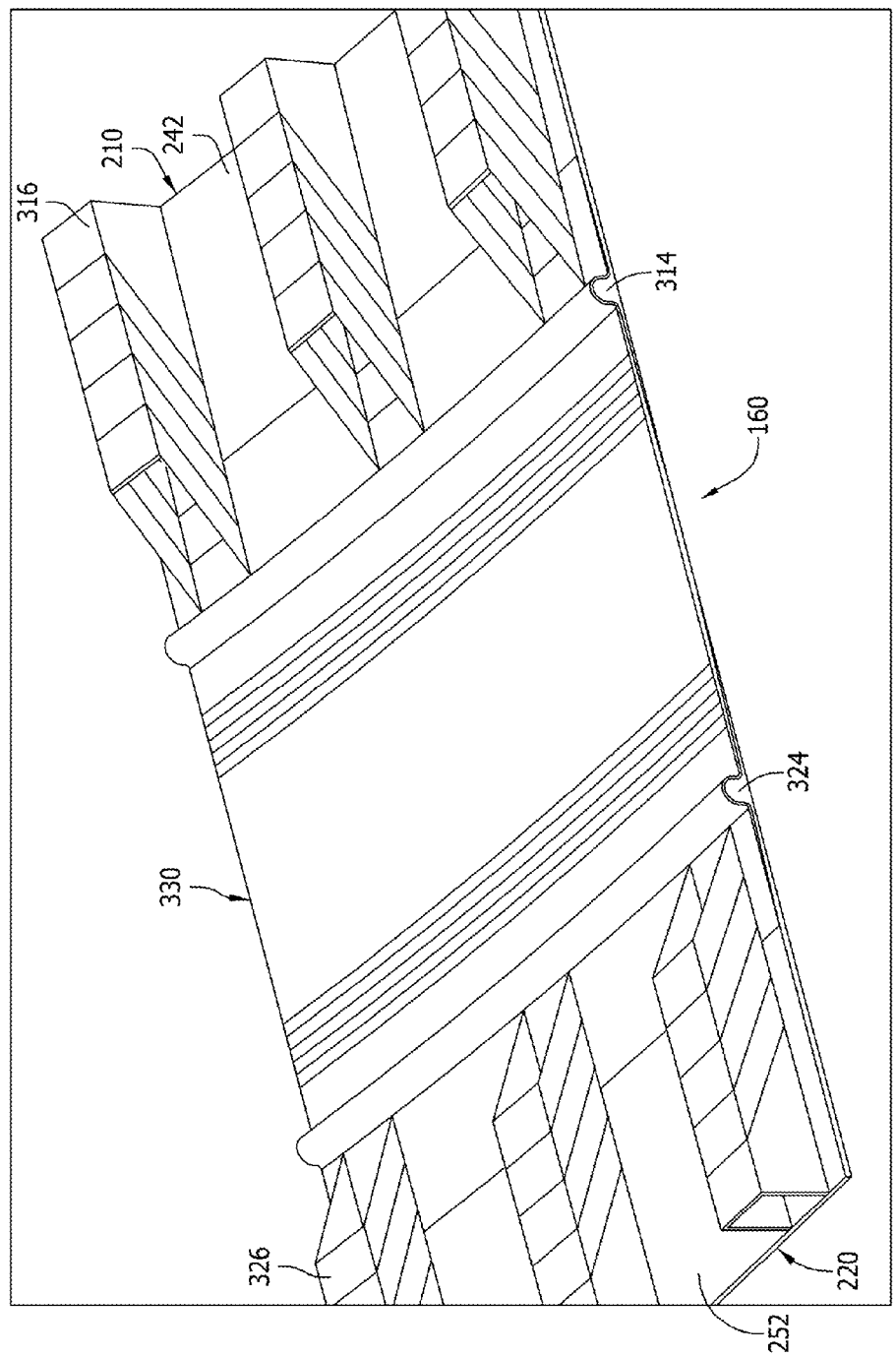
FIG. 6 is a perspective view of an exemplary scarf joint that may be used in assembling a fuselage.

FIG. 6 is a perspective view of an exemplary scarf joint 160 that may be used in assembling fuselage assembly 200 (shown in FIG. 1). In the exemplary embodiment, barrel sections 210 and 220 each include a strut 314 and 324 that is thicker than bodies 212 and 222, respectively. In the exemplary embodiment, a scarf 330 is formed integrally with each barrel section 210 and 220. For example, in the exemplary embodiment, barrel sections 210 and 220 are coupled together as scarf 330 is bonded to barrel sections 210 and 220. Scarf 330 facilitates preventing barrel sections 210 and 220 from uncoupling by engaging struts 314 and 324 during bonding. In an alternative embodiment, scarf 330 may be secured to inner surfaces 242 and 252 of respective barrel sections 210 and 220 via an adjoining member (not shown). The adjoining member may extend from a first barrel section stringer 316 to a second barrel section stringer 326 such that the adjoining member prevents scarf 330 from uncoupling from barrel sections 210 and 220.

Figure 7:
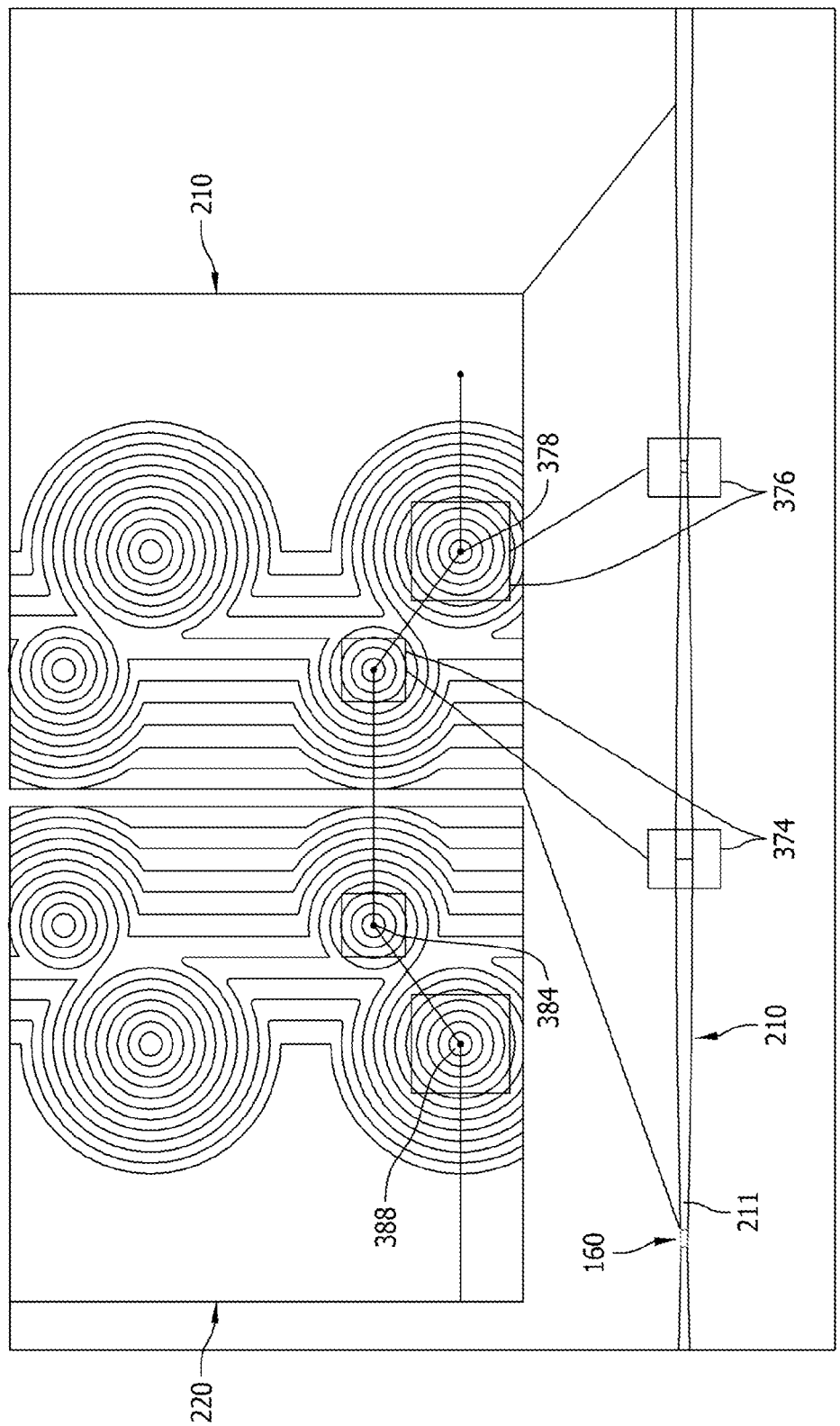
FIG. 7 is a topographical and cross-sectional view of an alternative exemplary scarf joint that may be used in assembling a fuselage.

FIG. 7 is a topographical and cross-sectional view of an alternative cured scarf joint 160 that may be used in assembling fuselage assembly 200 (shown in FIG. 1). First barrel section 210 includes a tapered step 374 and an indent 376. In the exemplary embodiment, barrel sections 210 and 220 are integrally formed with scarf 330 (shown in FIG. 6). Scarf 330 prevents first barrel section 210 from uncoupling from second barrel section 220 by engaging tapered step 374 and 384 during the integral formation. Furthermore, in the exemplary embodiment, scarf 330 couples together via a first opening 378 defined within barrel section 210, and located at the center of indent 376. Similarly, scarf 330 couples together via a second opening 388 defined in barrel section 220. Furthermore, in the exemplary embodiment, scarf 330 is constructed of a pre-impregnated ("pre-preg") composite material. As such, scarf 330 is co-cured through openings 378 and 388.

Figure 8:
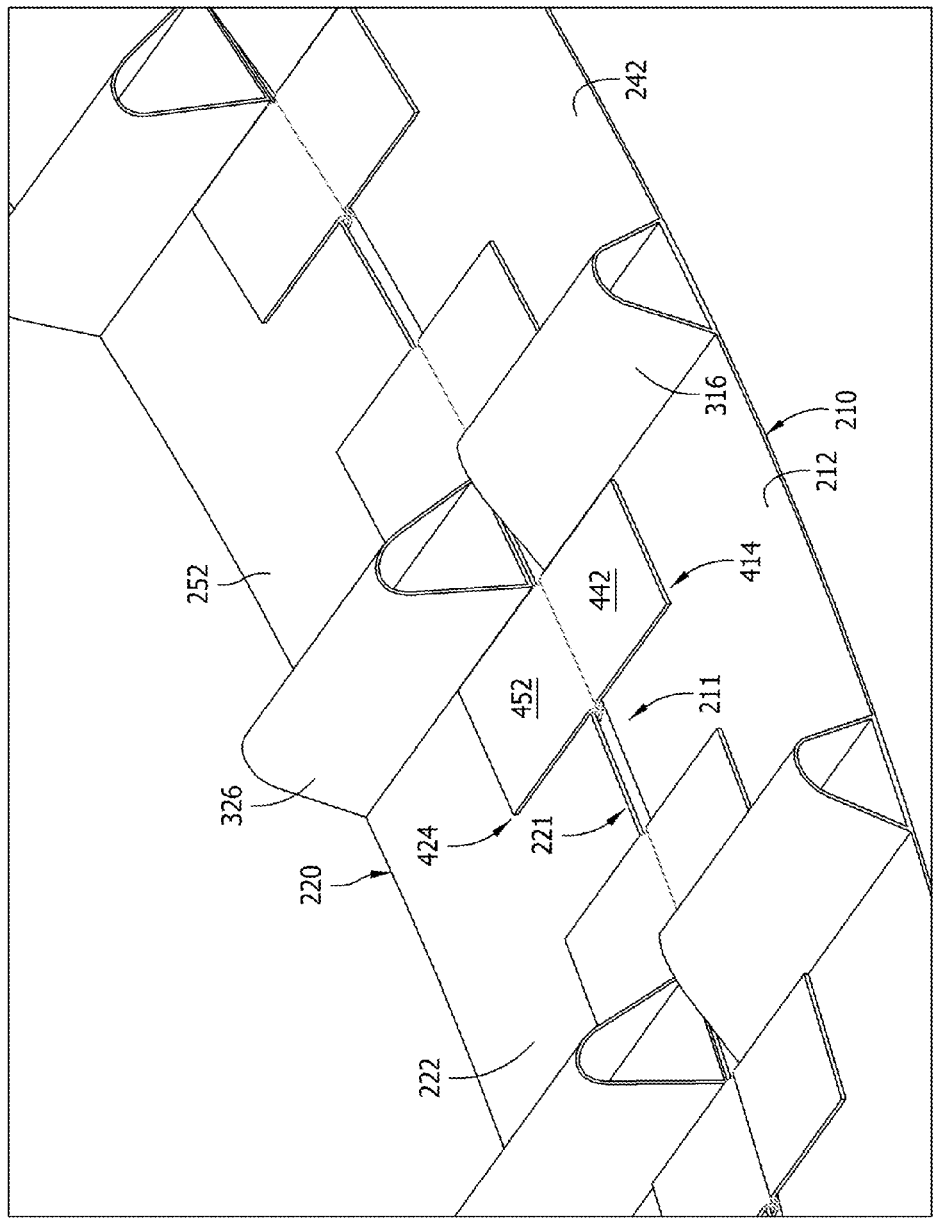
FIG. 8 is a perspective view of an exemplary folded flange joint that may be used in assembling a fuselage.
Figure 9:
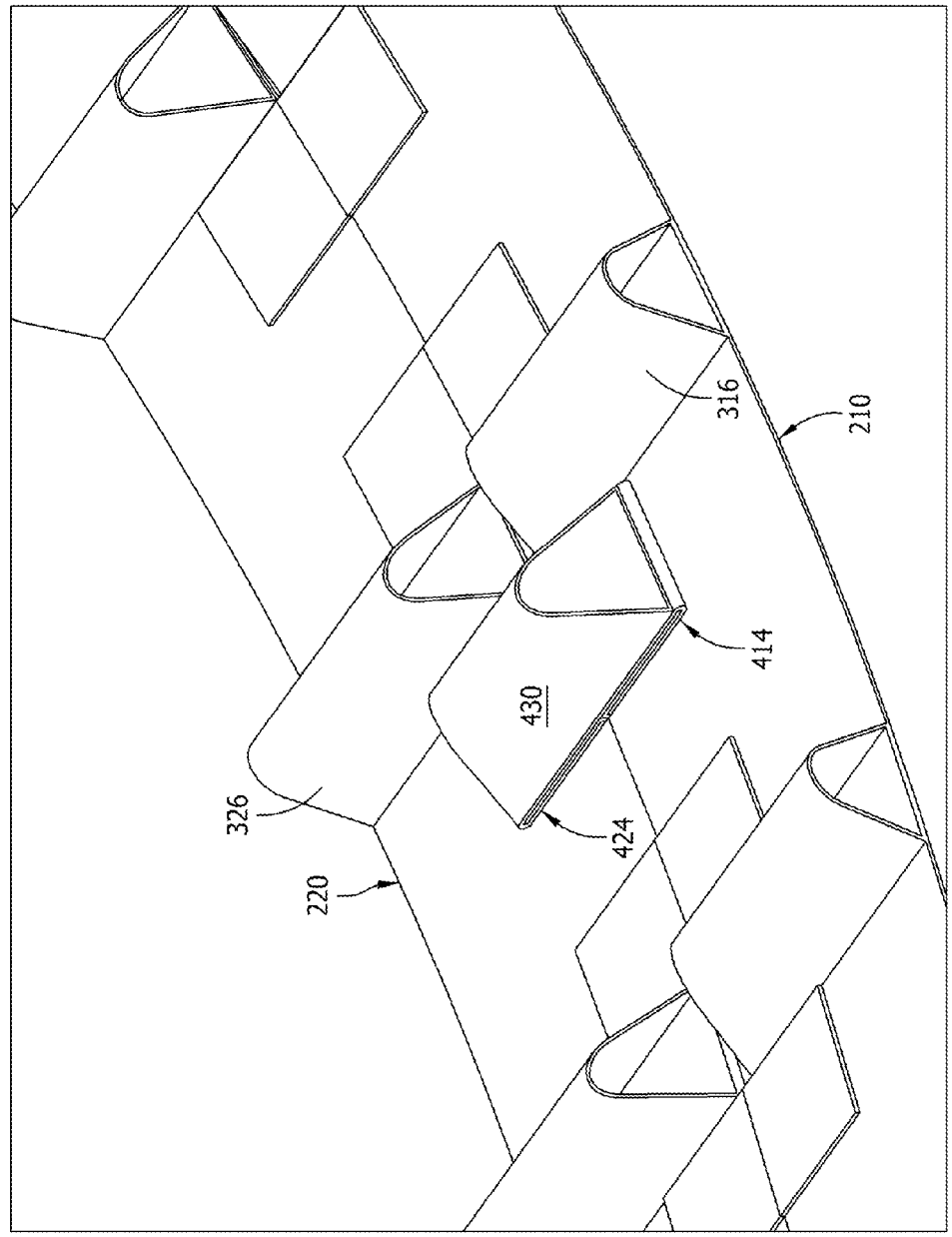
FIG. 9 is a perspective view of an exemplary folded flange joint shown in FIG. 8 that may be used in assembling a fuselage.

FIGS. 8 and 9 are perspective views of an exemplary folded flange joint 160 that may be used in assembling fuselage assembly 200 (shown in FIG. 1). In the exemplary embodiment, body 212 includes a folded flange 414 having a flange body 442 that extends substantially parallel to barrel section body 212. Similarly, body 222 includes a folded flange 424 having a flange body 452 that extends substantially parallel to barrel section body 222. In the exemplary embodiment, folded flanges 414 and 424 are substantially aligned with respect to each other when sections 210 and 220 are coupled together. More specifically, in the exemplary embodiment, flanges 414 and 424 are coupled to inner surfaces 242 and 252 of first and second barrel sections 210 and 220 such that a gap (not shown) is defined between body 442 and barrel section body 212. Similarly, a gap is defined between body 452 and barrel section body 222. Each gap is sized to receive an IML flange receptor 430. For example, each gap is approximately one eighth of an inch in length. In the exemplary embodiment, IML flange receptor 430 slidably engages with folded flanges 414 and 424 such that barrel sections 210 and 220 are coupled together. In an alternative embodiment, IML flange receptor 430 is pressed against stringers 316 and 326 by a mount (not shown). Furthermore, in the exemplary embodiment, flange receptor 430 is bonded to folded flanges 414 and 424.

FIGS. 10-15 depict alternative embodiments of physical capture that may be used in assembling fuselage assembly 200 (shown in FIG. 1). For example, in each of the exemplary embodiments, barrel sections 210 and 220 are coupled together using interlocking members. For example, barrel sections 210 and 220 may be interlocked using either a dovetail joint or a dog-bone joint. Barrel sections 210 and 220 are prevented from uncoupling in the dovetail and dog-bone joint embodiments via a plurality of tapered connections defined at the first and second barrel section second ends 213 and 223.

Figure 10:
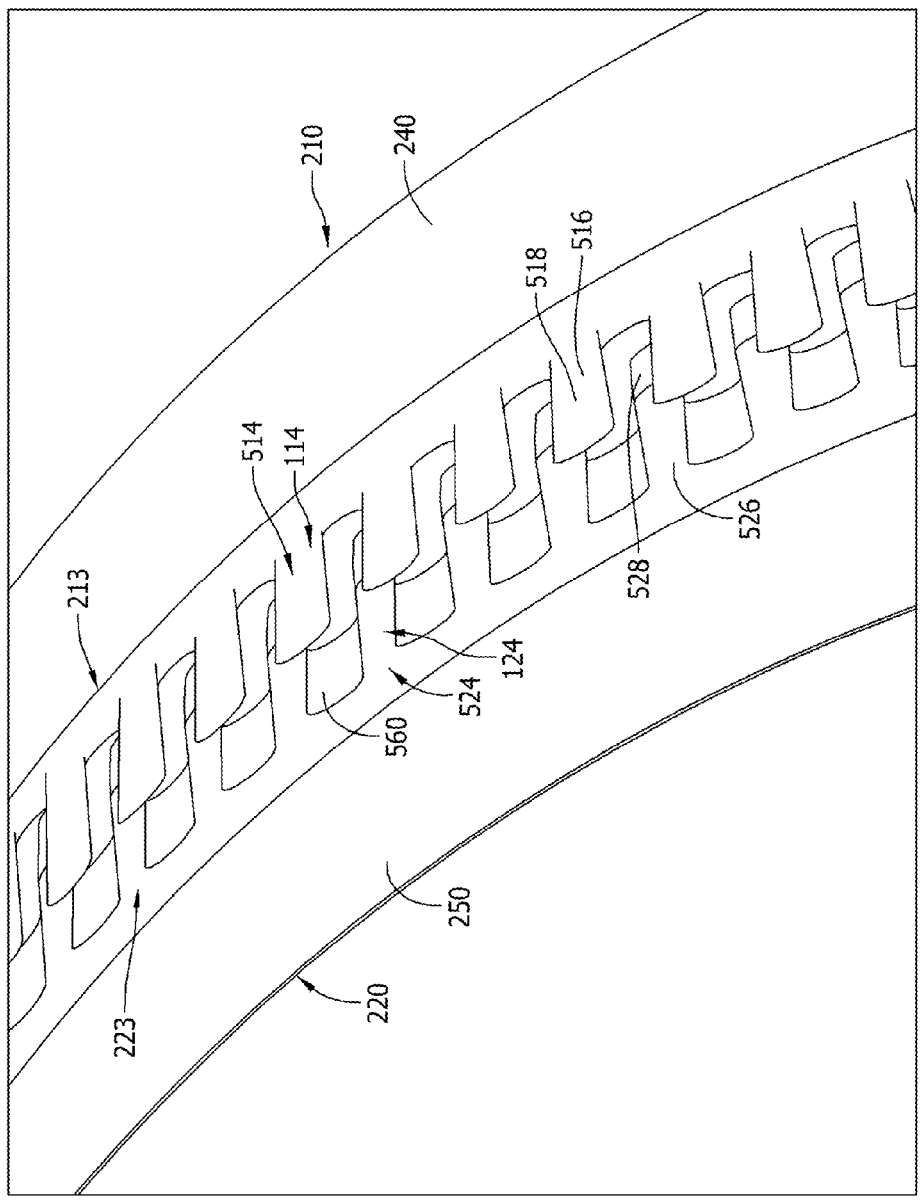
FIG. 10 is a perspective view of an exemplary shallow dovetail interlocking joint that may be used in assembling a fuselage.

FIG. 10 is a perspective view of an exemplary shallow dovetail interlocking joint 160 that may be used in assembling fuselage assembly 200 (shown in FIG. 1). In the exemplary embodiment, barrel sections 210 and 220 each include a plurality of shallow dovetails 514 and 524 that extend outward from a respective barrel section second end 213 and 223. More specifically, in the exemplary embodiment, first shallow dovetail 514 has a first end 516 and a second end 518. Second end 518 is received within a bonding area 560 of second barrel section 220. Similarly, second shallow dovetail 524 has a first end 526 and a second end 528 that is received within a bonding area (not shown) of inner surface 242 (shown in FIG. 3). Shallow dovetails 514 and 524 facilitate preventing barrel sections 210 and 220 from uncoupling by preventing the plurality of second ends 518 and 528 from passing between each other.

Figure 11:
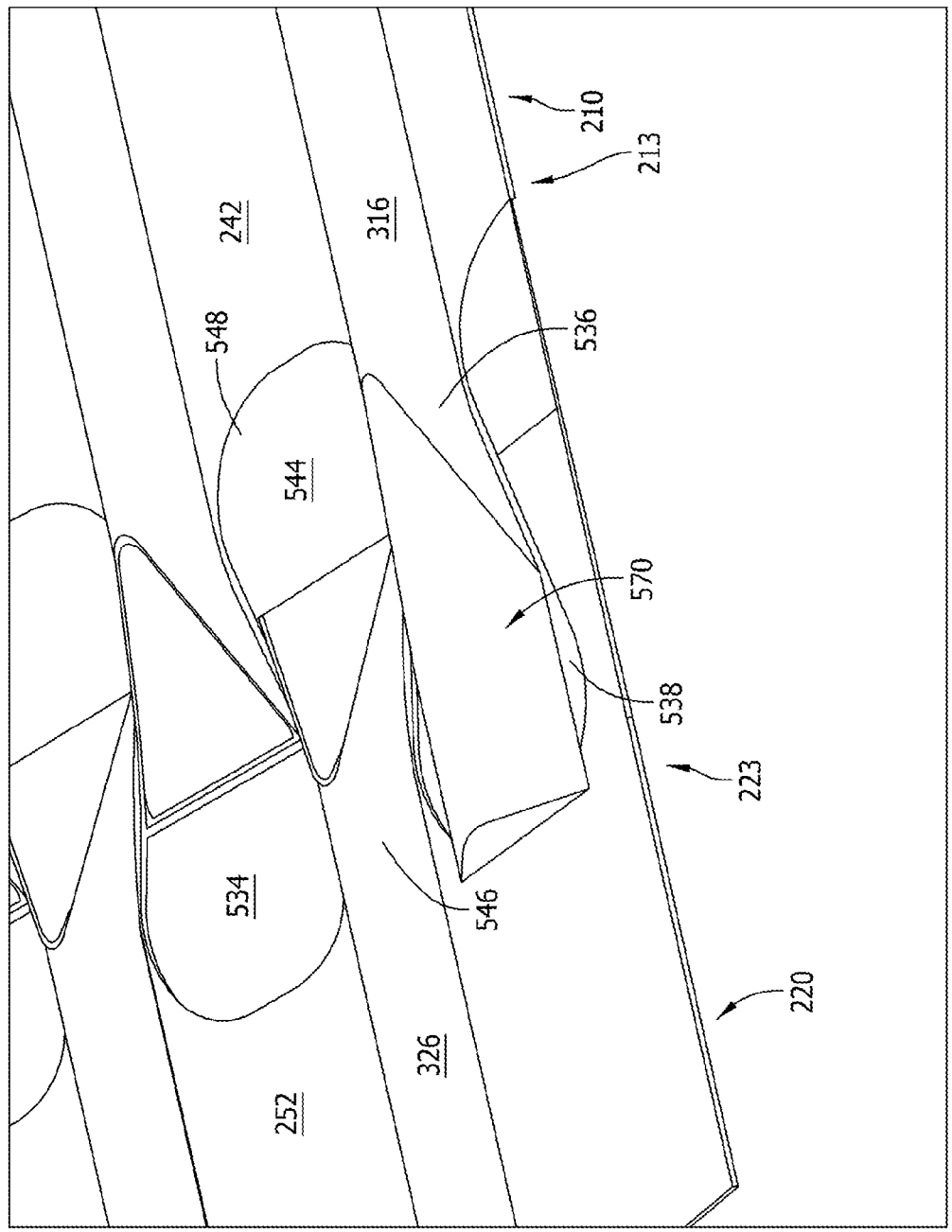
FIG. 11 is an enlarged sectional view of an exemplary wide dovetail interlocking joint that may be used in assembling a fuselage.

FIG. 11 is an enlarged perspective view of an exemplary wide dovetail interlocking joint 160 that may be used in assembling fuselage assembly 200 (shown in FIG. 1). In the exemplary embodiment, barrel sections 210 and 220 include a plurality of wide dovetails 534 and 544 that each extend outward from a respective barrel section second end 213 and 223. More specifically, in the exemplary embodiment, first wide dovetail 534 has a first end 536 and a second end 538. Second end 538 is received within a bonding area (not shown) of second barrel section 220. Similarly second wide dovetail 544 has a first end 546 and a second end 548 that is received within a bonding area (not shown) of first barrel section 210. Wide dovetails 534 and 544 facilitate preventing barrel sections 210 and 220 from uncoupling by preventing the plurality of second ends 538 and 548 from passing between each other. Wide dovetails 534 and 544 differ from shallow dovetails 514 and 524 in that it is more difficult for wide dovetails 534 and 544 to pass between each other as a result of their greater angle of contact.

Furthermore, in the exemplary embodiment, the interlocking dovetail joint 160 includes a cap 570. Cap 570 limits planar movement of shallow dovetails 514 and 524 and/or wide dovetails 534 and 544. For example, during operation, dovetails 514, 524, 534, and 544 may tend to buckle and thus uncouple from inner surfaces 242 and 252 of barrel sections 210 and 220, respectively. In the exemplary embodiment, cap 570 extends from stringer 316 and past second end 538 into contact with second barrel section 220. Cap 570 facilitates ensuring that second end 538 is substantially radially even with second barrel section 220. Cap 570 may be of any suitable size and configuration to limit planar movement. In the exemplary embodiment, cap 570 has a triangular cross-sectional shape that facilitates substantially firm engagement with stringer 316. As such, cap 570 has a moment of inertia sufficient to prevent peeling, buckling, or other out of plane movement of dovetail second end 538.

Figure 12:
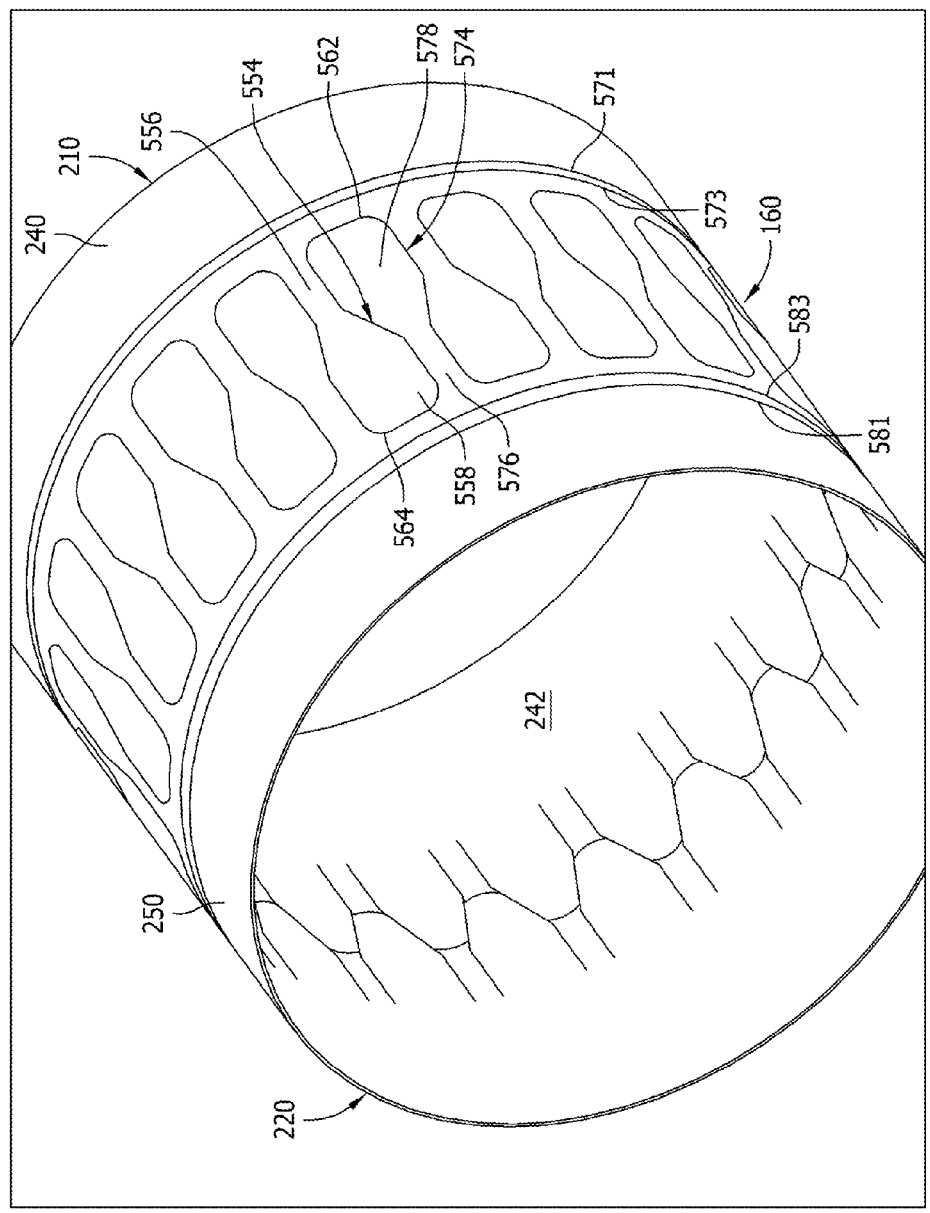
FIG. 12 is a perspective view of assembled fuselage using an exemplary tapered interlocking joint.

FIG. 12 is a perspective view of an exemplary tapered interlocking joint 160 that may be used in assembling fuselage assembly 200 (shown in FIG. 1). In the exemplary embodiment, barrel section 210 includes a plurality of tapered fingers 554 that are spaced in an alternating pattern with bonding areas 562 circumferentially about barrel section 210. In an alternative embodiment, bonding areas 562 may be located within the end of a plurality of stringers (not shown) spaced circumferentially about inner surface 242 of barrel section 210.

Furthermore, in the exemplary embodiment, barrel sections 210 and 220 are interlocked via respective tapered fingers 554 and 574. For example, when tapered fingers 554 of barrel section 210 are coupled to barrel section 220, tapered fingers 554 are expanded such that they have a larger circumference than a corresponding circumference of second barrel section 220. Barrel sections 210 and 220 are forced together and each tapered finger 554 couples with a bonding area 564 of barrel section 220, and each tapered finger 574 couples with bonding area 562 of barrel section 210. In the exemplary embodiment, bonding areas 562 and 564 have a shape that is substantially similar to a respective tapered finger 554 and 574. Once assembled, a second end 558 of tapered finger 554 is adjacent to a first end 576 of tapered finger 574, and a second end 578 of tapered finger 574 is adjacent to a first end 556 of tapered finger 554. Tapered fingers 554 and 574 facilitate preventing barrel sections 210 and 220 from uncoupling by preventing the plurality of second ends 558 and 578 from passing between each other.

Furthermore, in the exemplary embodiment, barrel sections 210 and 220 include first stepped indentations 571 and 581 and second stepped indentations 573 and 583. Stepped indentations 571 and 581, and 573 and 583 receive at least a two-ply OML wrap (not shown) that substantially conforms to the profile of the stepped indentations. For example, in one embodiment, the two-ply OML wrap may fit within stepped indentations 573 and 583 such that an outer surface of the two-ply OML wrap is substantially flush with respect to outer surfaces 240 and 250. The OML wrap also facilitates preventing peeling of tapered fingers 554 and 574 from respective bond areas 562 and 564. In another alternative embodiment, tapered finger 574 extends from first end 576 and tapers to second end 578 such that second end 578 is not as thick as first end 576. Although the tapering of tapered finger 574 is described, it should be understood that the same may apply to tapered flange 554. Furthermore, the tapering of finger 574 facilitates preventing peeling of tapered finger 574 from bond area 562. As such, the tapering of fingers 554 and 574 facilitates creating a substantially planar profile across bond joint 160. Furthermore, in the exemplary embodiment, tapered fingers 554 and 574 are both received on the outer mold line side of barrel section 210 and 220. As such, tapered fingers 554 and 574 are fully encapsulated by OML wrap 232 (shown in FIG. 2).

Figure 13:
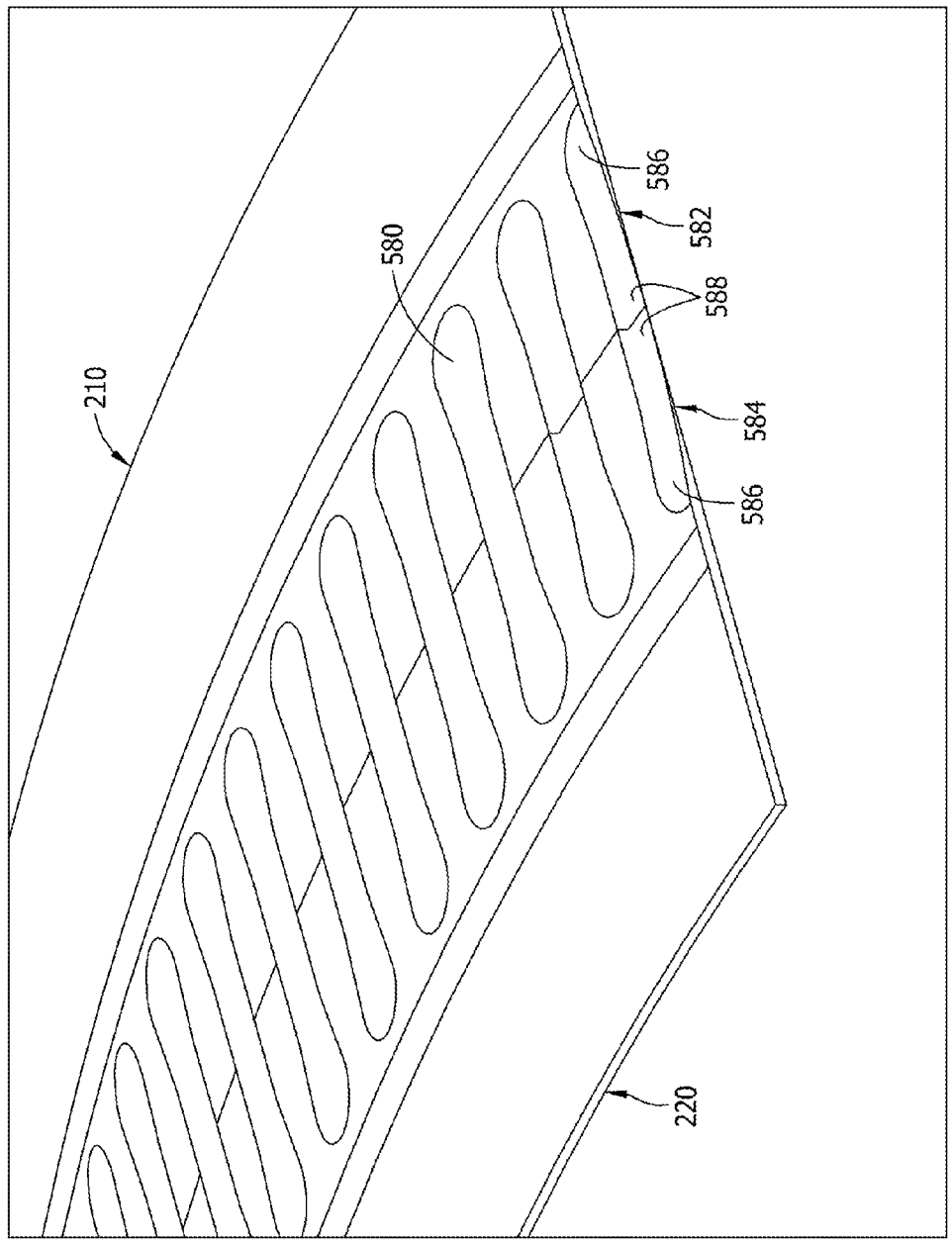
FIG. 13 is a perspective view of an exemplary interlocking tapered dog-bone joint that may be used in assembling a fuselage.

FIG. 13 is a perspective view of an exemplary interlocking dog-bone joint 160 that may be used in assembling fuselage assembly 200 (shown in FIG. 1). In the exemplary embodiment, barrel section 210 includes a tapered bond area 582 and second barrel section 220 includes a tapered bond area 584. Tapered bond areas 582 and 584 have respective first ends 588 and second ends 586, wherein second end 586 has a larger surface area than first end 588. Barrel sections 210 and 220 are coupled together such that tapered bond areas 582 and 584 are substantially aligned with each other. Furthermore, in the exemplary embodiment, a dog-bone connector 580 couples with each tapered bond area 582 and 584. For example, in one embodiment, dog-bone connector 580 has a shape that substantially conforms to the combined shape of tapered bond areas 582 and 584. The distal ends of dog-bone connector 580 facilitate preventing barrel sections 210 and 220 from uncoupling by preventing the distal ends from passing through first ends 588 of each tapered bond area 582 and 584.

Figure 14:
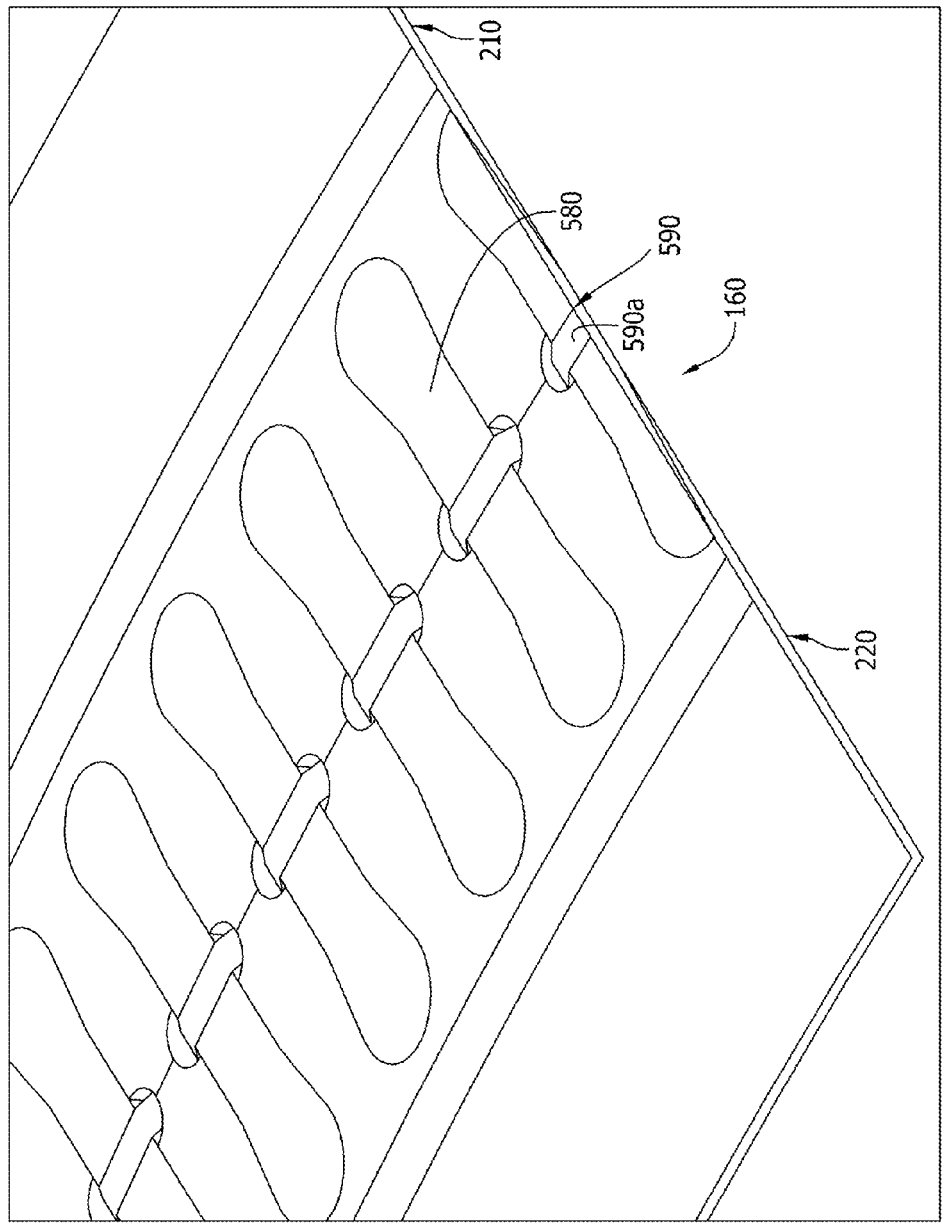
FIG. 14 is an external sectional view of an alternative tapered dog-bone joint that may be used in assembling a fuselage.
Figure 15:
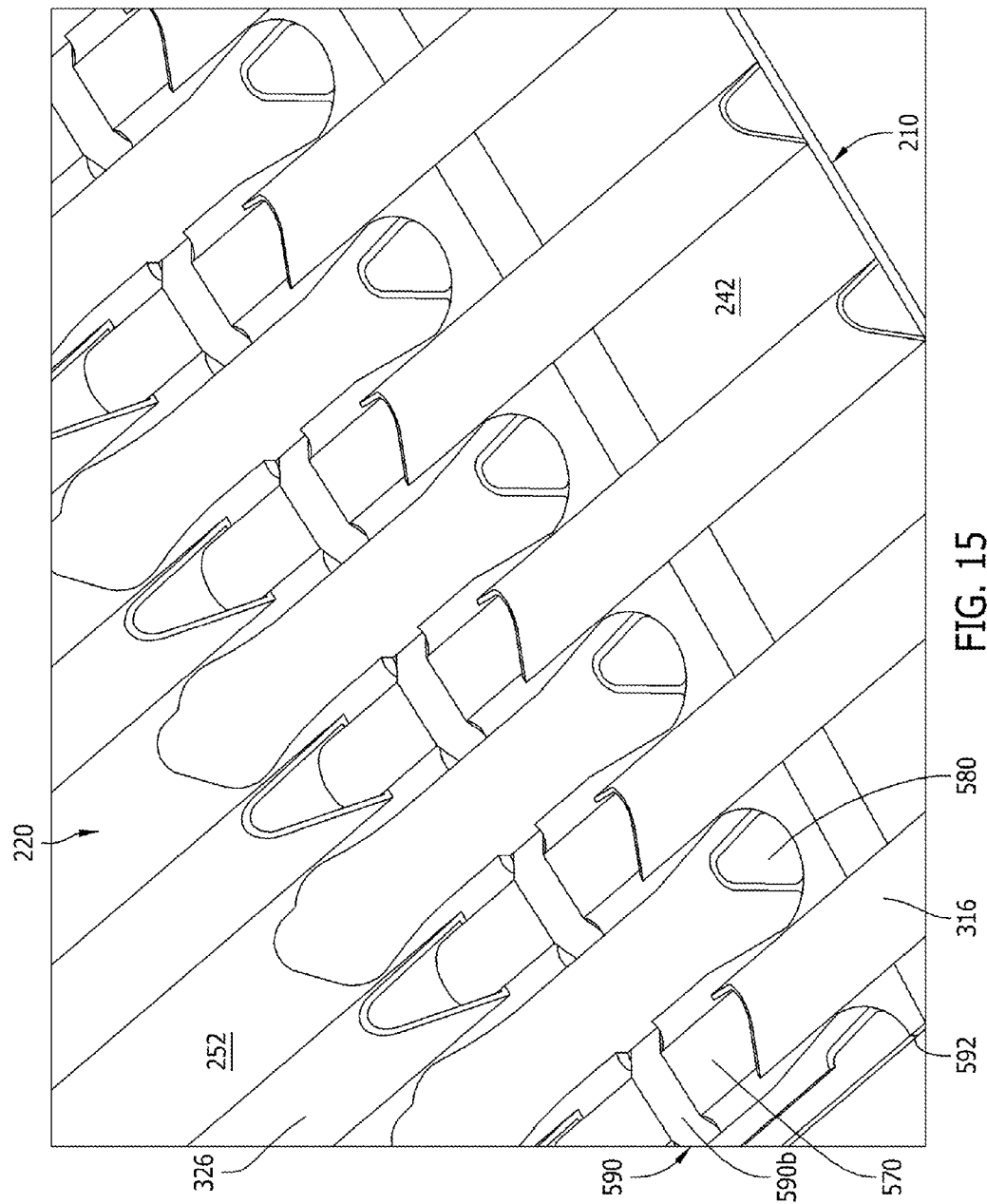
FIG. 15 is an internal perspective view of a through-thickness dog-bone joint that may be used in assembling a fuselage.

FIG. 14 is a sectional view and FIG. 15 is a perspective view of an exemplary dog-bone joint 160 that may be used in assembling fuselage assembly 200 (shown in FIG. 1). More specifically, FIG. 14 is an external view of barrel sections 210 and 220 at joint 160 of one tapered dog-bone embodiment, and FIG. 15 depicts an internal view of barrel sections 210 and 220 at joint 160 of a through-thickness dog-bone embodiment. In the exemplary embodiments, dog-bone connector 580 extends at least partially through barrel sections 210 and 220. Furthermore, in the exemplary embodiment, cap 570 facilitates preventing stringer pull-off and provides a bond area for load transfer of respective barrel sections 210 and 220. For example, cap 570 may be coupled to inner surfaces 242 and 252 of each barrel section 210 and 220. In the exemplary embodiment, cap 570 extends from stringer 316 to stringer 326 of barrel section 220. Cap 570 may be of any suitable shape or configuration and in an alternative embodiment, cap 570 includes distal ends that have a greater width than a center portion of cap 570.

Moreover, in the exemplary embodiment, the dog-bone joint 160 includes a band 590 that facilitates securing each cap 570 and dog-bone connector 580 to barrel sections 210 and 220. For example, band 590 continuously weaves from the inner mold line to the outer mold line circumferentially about barrel sections 210 and 220. More specifically, an IML section 590b of band 590 engages with and secures cap 570, and weaves to the outer mold line such that OML section 590a engages with and secures dog-bone connector 580. Moreover, in one embodiment, band 590 substantially circumscribes barrel sections 210 and 220.

Furthermore, the dog-bone joint 160 may accept deviation of rotational movement of barrel sections 210 and 220. During assembly, barrel sections 210 and 220 may have to be rotated with respect to each other such that a physical capture feature becomes uncoupled from a bond area. Dog-bone connector 580 compensates for rotational movement of barrel sections 210 and 220 by enabling dog-bone connector 580 to shift within dog-bone aperture 592. For example, the dog-bone joint 160 may accommodate up to about a 0.1" radial mismatch within second ends 213 and 223 (shown in FIG. 1) as well as up to about a 2° rotational mismatch between barrel sections 210 and 220.

Figure 16:
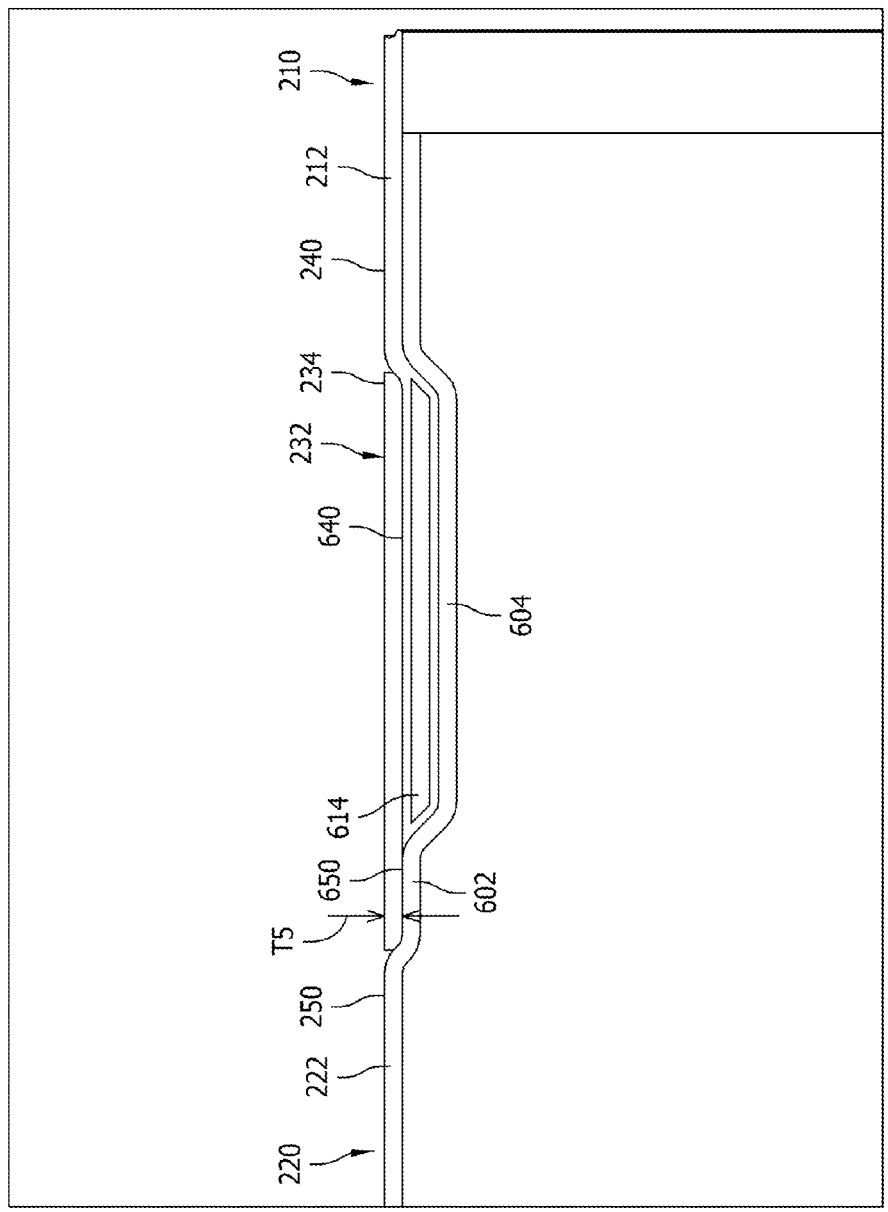
FIG. 16 is a cross-sectional view of an exemplary lap joint that may be used in assembling a fuselage.

FIG. 16 is a cross-sectional view of an exemplary lap joint 614 that may be used in assembling fuselage assembly 200 (shown in FIG. 1). In the exemplary embodiment, barrel section 220 includes a first circumferential stepped indentation 602 and a second circumferential stepped indentation 604. Each circumferential stepped indentation 602 and 604 extends radially inward with respect to second barrel section body 222. Barrel section 210 includes a physical capture feature such as a lap joint 614. Lap joint 614 is received within second circumferential stepped indentation 604 such that an outer surface 640 of lap joint 614 is substantially flush with an outer surface 650 of first circumferential stepped indentation 602. In the exemplary embodiment, OML wrap 232 induces a compressive force to barrel sections 210 and 220 to prevent disengagement of lap joint 614 from second circumferential stepped indentation 604. For example, OML wrap 232 may be coupled to outer surfaces 640, outer surface 650, and first circumferential stepped indentation 602. OML wrap 232 may also have a thickness $T_5$ such that outer surface 234 of OML wrap 232 is substantially flush with respect to outer surfaces 240 and 250.

Figure 17:
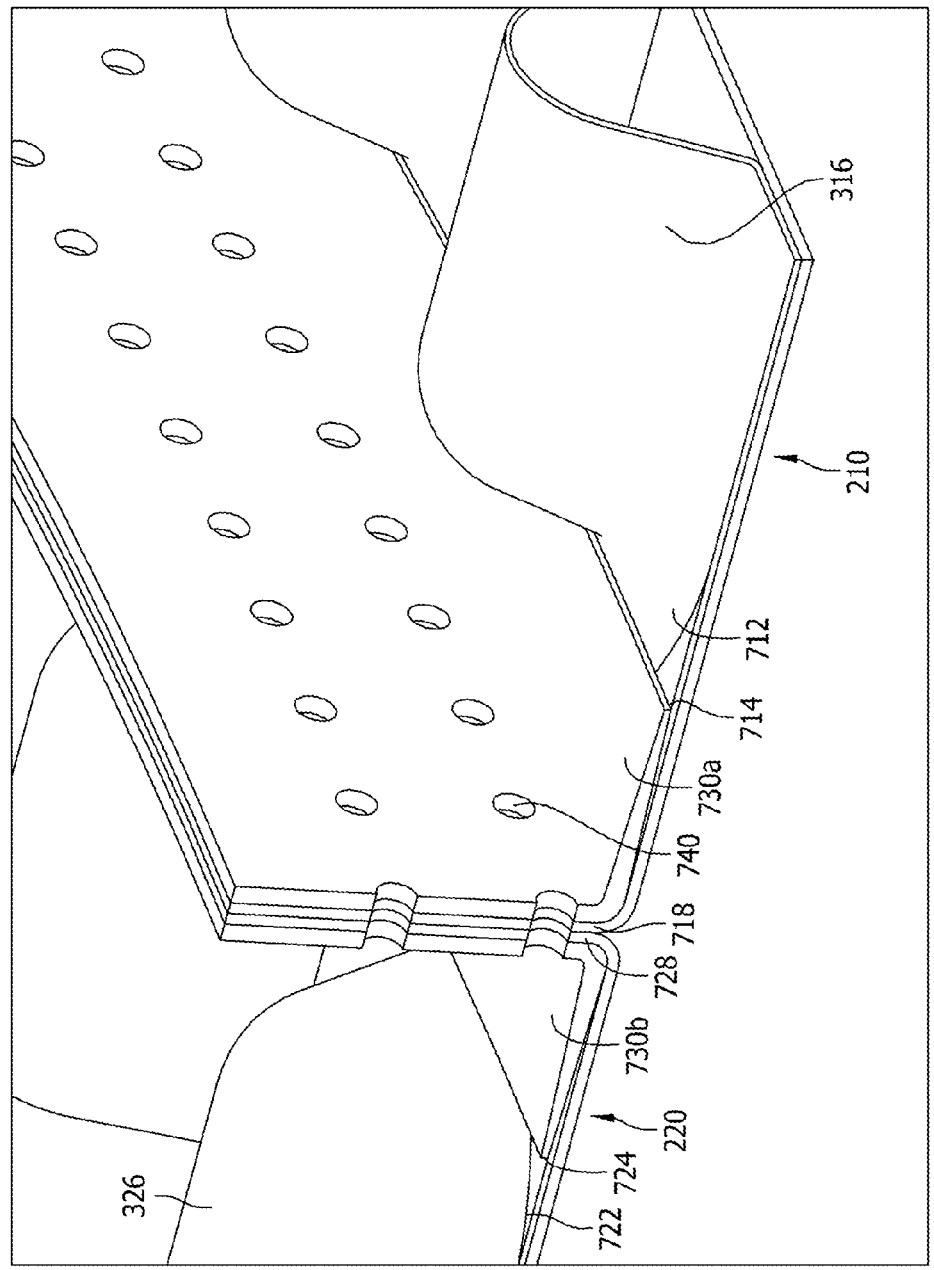
FIG. 17 is a sectional view of an exemplary flange capture joint that may be used in assembling a fuselage assembly.

FIG. 17 is a sectional view of flange capture that may be used in assembling fuselage assembly 200 (shown in FIG. 1). In the exemplary embodiment, barrel sections 210 and 220 include a first flange 718 and a second flange 728 that each extend substantially perpendicularly from each respective barrel section 210 and 220. First barrel section 210 includes a first body 712 and a first side wall 714, and second barrel section 220 includes a second body 722 and a second side wall 724. In the exemplary embodiment, IML frame 730a is coupled to flange 718 and body 712, and IML frame 730b is coupled to flange 728 and body 722. Moreover, IML frames 730a and 730b are configured to prevent first and second barrel sections 210 and 220 from uncoupling. For example, in one embodiment, IML frame 730a is positioned between first side wall 714 and flange 718, and IML frame 730b is positioned between first side wall 724 and flange 728. Each IML frame 730a and 730b is positioned such that respective side walls 714 and 724 force IML frames 730a and 730b against respective flanges 718 and 728. In one embodiment, IML frames 730a and 730b are secured to flanges 718 and 728 by a plurality of bolts (not shown) via a bolting aperture 740. As such, forcing IML frames 730a and 730b against respective flanges 718 and 728 facilitates preventing first barrel section 210 from uncoupling from second barrel section 220 by capturing flanges 718 and 728 between IML frames 730a and 730b.

Figure 18:
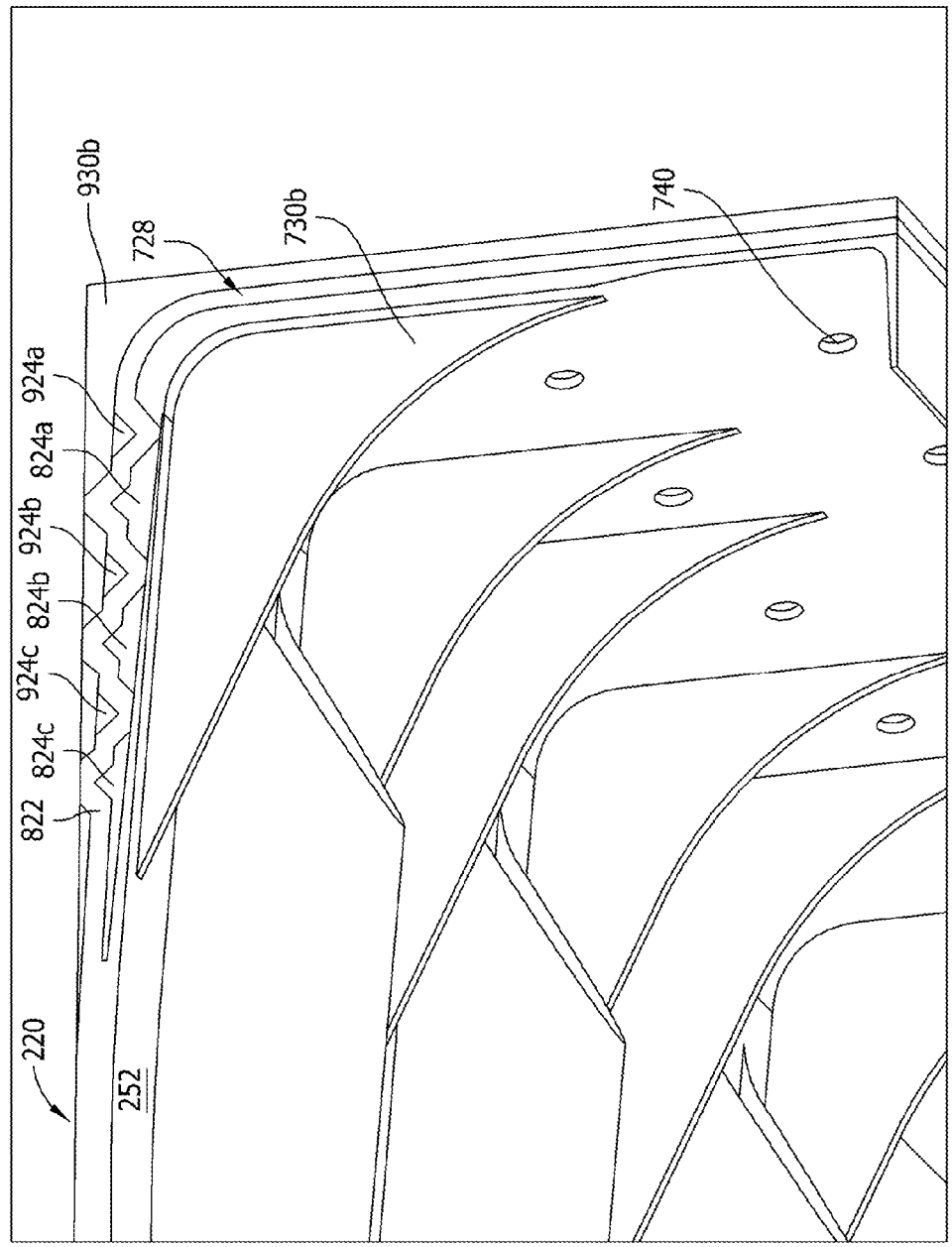
FIG. 18 is a cross-sectional view of an exemplary nested cleat frame joint that may be used in assembling a fuselage.

FIG. 18 is a cross-sectional view of exemplary cleat frames that may be used in assembling fuselage assembly 200 (shown in FIG. 1). In the exemplary embodiment, barrel section 220 includes flange 728, body 822, and IML frame 730b. IML frame 730b includes cleats 824a, 824b, and 824c. Furthermore, in the exemplary embodiment, an IML frame 930b is positioned adjacent to flange 728 and includes cleats 924a, 924b, and 924c. IML frame 730b and IML frame 930b are formed integrally into barrel section 220 by heating frames 730b and 930b and barrel section 220. As such, cleats 824a, 824b, and 824c and cleats 924a, 924b, and 924c sink into barrel section body 822. IML frames 730b and 930b are then be secured to flange 728. Furthermore, the integration of cleats 824a, 824b, and 824c and cleats 924a, 924b, and 924c into barrel section body 822 substantially eliminates the need for flush fasteners inserted through barrel section 220.

Figure 19:
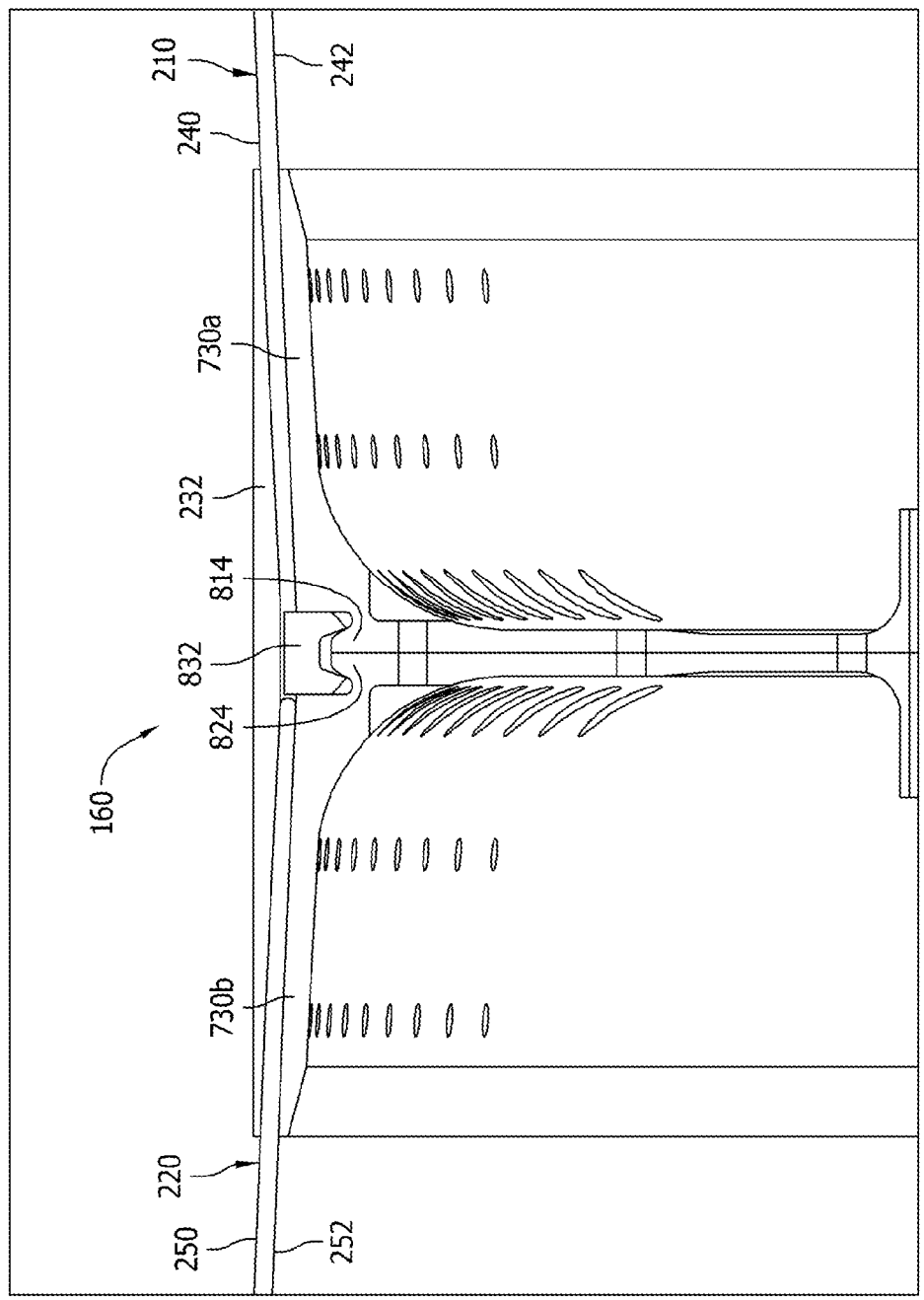
FIG. 19 is a cross-sectional view of an exemplary Marmon clamp joint that may be used in assembling a fuselage.

FIG. 19 is a cross-sectional view of an exemplary Marmon clamp joint 160 that may be used in assembling fuselage assembly 200 (shown in FIG. 1). In the exemplary embodiment, IML frames 730a and 730b are coupled to respective inner surfaces 242 and 252 of barrel sections 210 and 220. IML frame 730a includes a first ridge 814 positioned adjacent to a second ridge 824 of IML frame 730b. Clamp 832 engages with ridges 814 and 824 to substantially prevent IML frame 730a from uncoupling from IML frame 730b. Furthermore, a compressive force may be applied by OML wrap 232 to clamp 832 such that clamp 832 is compressively engaged with first and second ridges 814 and 824.

In each of the joint embodiments described herein, and more specifically with respect to the wedge, nodule, and scarf joint embodiments, physical capture features may be constructed of any suitable material. For example, in one embodiment, the physical capture features may be constructed from a composite material that includes a plurality of filler plies. The implementation of composite material in the construction of physical capture features requires thickness tapering of the composite through the use of strategic drop off plies. The resulting physical capture feature has an increased thickness that facilitates physical capture.

The systems and methods for use in assembling a fuselage described herein facilitate the manufacture of an aircraft fuselage. More specifically, the assemblies described herein facilitate reducing manufacturing time of an aircraft fuselage by essentially eliminating the need for fasteners when coupling fuselage barrel sections together. Using fasteners to couple fuselage barrel sections together is a time-consuming process that involves accurately locating, drilling, and deburring holes that receive the fasteners. Furthermore, drilling holes through carbon fiber material may weaken the material. As such, carbon fiber barrel sections that use fasteners include additional filler plies to facilitate compensating for the weakened material. By essentially eliminating the need for fasteners, manufacturing time is reduced without compromising the effectiveness of the joints that couple barrel sections together. Furthermore, weight is reduced by essentially eliminating the need for fasteners and by reducing the amount of carbon fiber material used to compensate for weakened material caused by the presence of drill holes.

Practice of the methods, apparatus, or systems described or illustrated herein is neither limited to the manufacture of traditional or composite aircraft fuselages. Rather, the methods, apparatus, and systems described or illustrated herein may be utilized independently and separately from other components and/or steps described herein. Although specific features of various embodiments may be shown in some drawings and not in others, this is for convenience only. As such, a feature of a drawing may be referenced and/or claimed in combination with any feature of any other drawing.

This written description uses examples to disclose the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a fuselage, said method comprising:

providing a first barrel section including a body that extends from a first end to a second end, wherein a thickness of the first barrel section second end is greater than a thickness of the first barrel section body, and the first barrel section has an inner surface that at least partially defines a cavity and an outer surface opposite the inner surface;

providing a second barrel section including a body that extends from a first end to a second end, wherein a thickness of the second barrel section second end is greater than a thickness of the second barrel section body, and the second barrel section has an inner surface that at least partially defines the cavity and an outer surface opposite the inner surface;

coupling the first barrel section second end to the second barrel section second end at a joint;

positioning a compression member adjacent to the joint within the cavity, wherein a cross-sectional shape of the compression member includes a surface configured to substantially conform to the first barrel section second end and the second barrel section second end; and securing the compression member circumferentially against the inner surface of at least one of the first barrel section and the second barrel section to induce a compressive force from the compression member to the at least one of the first barrel section and the second barrel section to maintain the coupling therebetween.

2. The method in accordance with claim 1 further comprising:

positioning a tension member adjacent to the joint; and securing the tension member circumferentially against the outer surface of at least one of the first and second barrel sections to induce a compressive force to the at least one of the first and second barrel sections to maintain the coupling therebetween.

3. The method in accordance with claim 1, wherein coupling the first barrel section second end to the second barrel section second end comprises using a plurality of interlocking members to couple the first barrel section end to the second barrel section end.

4. A fuselage assembly comprising:

a first barrel section comprising a body extending from a first end to a second end, wherein a thickness of said first barrel section second end is greater than a thickness of said first barrel section body, and said first barrel section has an inner surface that at least partially defines a cavity and an outer surface opposite said inner surface;

a second barrel section comprising a body extending from a first end to a second end, wherein a thickness of said second barrel section second end is greater than a thickness of said second barrel section body, the second end of said first barrel section is coupled to the second end of said second barrel section at a joint, and said second barrel section has an inner surface that at least partially defines the cavity and an outer surface opposite said inner surface; and a compression member positioned adjacent to said joint within the cavity, a cross-sectional shape of said compression member includes a surface configured to substantially conform to said first barrel section second end and said second barrel section second end such that said compression member maintains a coupling between said first barrel section and said second barrel section, wherein said compression member is secured circumferentially against said inner surface of at least one of said first barrel section and said second barrel section to induce a compressive force to said at least one of said first barrel section and said second barrel section.

5. The fuselage assembly in accordance with claim 4, wherein a thickness of said first barrel section tapers continuously from said first barrel section second end to said first barrel section body.

6. The fuselage assembly in accordance with claim 5, wherein a thickness of said second barrel section tapers continuously from said second barrel section second end to said second barrel section body.

7. The fuselage assembly in accordance with claim 4 further comprising at least one barrel nut configured to secure said compression member to said first barrel section and said second barrel section.

8. The fuselage assembly in accordance with claim 4, wherein at least one of said first barrel section second end and said second barrel section second end comprises a composite material.

9. The fuselage assembly in accordance with claim 4, wherein said first barrel section second end is configured to interlock with said second barrel section second end when said first barrel section is coupled to said second barrel section.

10. The fuselage assembly in accordance with claim 9, wherein said first barrel section second end comprises a plurality of second end portions that extend past said joint and engage with said second barrel section body, and wherein said second barrel section second end comprises a plurality of second end portions that extend past said joint and engage with said first barrel section body, said first barrel section plurality of second end portions is interlocked with said second barrel section plurality of second end portions.

11. The fuselage assembly in accordance with claim 10 wherein said compression member surface tapers from a midpoint adjacent said joint to an edge adjacent a terminal edge of said first barrel section plurality of second end portions.

12. The fuselage assembly in accordance with claim 11, wherein said compression member surface tapers from said midpoint to an edge adjacent a terminal edge of said second barrel section plurality of second end portions.

13. The fuselage assembly in accordance with claim 4, wherein said fuselage assembly further comprises a tension member adjacent to said joint that extends circumferentially about said outer surface of said at least one of said first and second barrel sections to induce a compressive force to said at least one of said first and second barrel sections to maintain the coupling therebetween.

14. The fuselage assembly in accordance with claim 4, wherein said compression member is formed integrally with at least one of said first barrel section and said second barrel section.

15. An aircraft comprising:

a first fuselage component comprising a body extending from a first end to a second end, said first fuselage component body comprising an arcuate configuration, wherein a thickness of said first fuselage component second end is greater than a thickness of said first fuselage component body, and said first fuselage component has an inner surface that at least partially defines a cavity and an outer surface opposite said inner surface;

a second fuselage component comprising a body extending from a first end to a second end, said second fuselage component body comprising an arcuate configuration, wherein a thickness of said second fuselage component second end is greater than a thickness of said second fuselage component body, said second end of said first fuselage component is coupled to said second end of said second fuselage component at a joint, and said second fuselage component has an inner surface that at least partially defines the cavity and an outer surface opposite said inner surface; and a compression member positioned adjacent to said joint within the cavity, a cross-sectional shape of said compression member includes a surface configured to substantially conform to said first fuselage component second end and said second fuselage component second end, said compression member operable to maintain a coupling between said first fuselage component and said second fuselage component, wherein said compression member is securable circumferentially against said inner surface of at least one of said first fuselage component and said second fuselage component to induce a compressive force to said at least one of said first fuselage component and said second fuselage component.

16. The aircraft in accordance with claim 15 further comprising a tension member adjacent to said joint that extends circumferentially about said outer surface of said at least one of said first and second fuselage components to induce a compressive force to said at least one of said first and second fuselage components to maintain the coupling therebetween.

17. The aircraft in accordance with claim 15 wherein a thickness of said first fuselage component tapers continuously from said first fuselage component second end to said first fuselage component body.

18. The aircraft in accordance with claim 17 wherein a thickness of said second fuselage component tapers continuously from said second fuselage component second end to said second fuselage component body.

19. The aircraft in accordance with claim 15, wherein said compression member is sized to extend circumferentially about said joint.

* * * * *